(12) United States Patent
Ezra et al.

(10) Patent No.: US 9,311,016 B2
(45) Date of Patent: Apr. 12, 2016

(54) STORAGE SYSTEM CAPABLE OF MANAGING A PLURALITY OF SNAPSHOT FAMILIES AND METHOD OF OPERATING THEREOF

(71) Applicant: Infinidat Ltd., Hertzelia Pituach (IL)

(72) Inventors: Josef Ezra, Even Yehuda (IL); Yechiel Yochai, Moshav Aviel (IL); Ido Ben-Tsion, Ramat Gan (IL); Efraim Zeidner, Haifa (IL); Nir Schenkler, Haifa (IL)

(73) Assignee: INFINIDAT LTD., Herzliya (IL)

( * ) Notice: Subject to any disclaimer, the term of this patent is extended or adjusted under 35 U.S.C. 154(b) by 181 days.

(21) Appl. No.: 14/092,243

(22) Filed: Nov. 27, 2013

(65) Prior Publication Data

US 2014/0149698 A1    May 29, 2014

Related U.S. Application Data

(60) Provisional application No. 61/730,988, filed on Nov. 29, 2012.

(51) Int. Cl.
| | |
|---|---|
| *G06F 17/30* | (2006.01) |
| *G06F 3/06* | (2006.01) |
| *G06F 11/14* | (2006.01) |
| *G06F 12/08* | (2006.01) |

(52) U.S. Cl.
CPC .............. *G06F 3/065* (2013.01); *G06F 3/0604* (2013.01); *G06F 3/0605* (2013.01); *G06F 3/0614* (2013.01); *G06F 3/0683* (2013.01); *G06F 3/0689* (2013.01); *G06F 11/1446* (2013.01); *G06F 11/1458* (2013.01); *G06F 12/0864* (2013.01); *G06F 17/30088* (2013.01); *G06F 2201/84* (2013.01)

(58) Field of Classification Search
None
See application file for complete search history.

(56) References Cited

U.S. PATENT DOCUMENTS

| | | |
|---|---|---|
| 4,864,497 A | 9/1989 | Lowry |
| 5,553,266 A | 9/1996 | Metzger |
| 6,353,836 B1 | 3/2002 | Bamford |
| 6,651,075 B1 | 11/2003 | Kusters et al. |
| 7,600,098 B1 | 10/2009 | Chou |
| 8,019,944 B1 | 9/2011 | Favor et al. |
| 8,082,407 B1 | 12/2011 | Chatterjee et al. |
| 8,359,491 B1 * | 1/2013 | Bloomstein ......... G06F 11/1662 714/6.3 |
| 8,706,705 B1 | 4/2014 | Warrington |

(Continued)

*Primary Examiner* — Kaushikkumar Patel
(74) *Attorney, Agent, or Firm* — Reches Patents

(57) ABSTRACT

There is provided a storage system and a method of identifying delta-data therein between two points-in-time. The method comprises: generating successive snapshots $S_i$ and $S_{i+1}$ corresponding to the two points-in-time; upon generating the snapshot $S_{i+1}$, searching the cache memory for data blocks associated with snap_version=i, thereby yielding cached delta-metadata; searching the SF mapping data structure for destaged data blocks associated with snap_version=i, thereby yielding destaged delta-metadata; and joining the cached delta-metadata and the destaged delta-metadata, thereby yielding delta-metadata indicative of the delta-data between points-in-time corresponding to the successive snapshots with Snap_ID=i and Snap_ID=i+1. The method operates with no need in copying, destaging to a dedicated location and/or any other special handling of data that needs to be transmitted to the RS system.

17 Claims, 25 Drawing Sheets

(56) References Cited

U.S. PATENT DOCUMENTS

| | | | |
|---|---|---|---|
| 9,021,087 B1* | 4/2015 | Weng | H04L 67/1095 709/213 |
| 2002/0069341 A1 | 6/2002 | Chauvel et al. | |
| 2002/0073282 A1 | 6/2002 | Chauvel et al. | |
| 2003/0079102 A1 | 4/2003 | Lubbers et al. | |
| 2004/0078533 A1* | 4/2004 | Lee | G06F 11/1456 711/162 |
| 2004/0267706 A1* | 12/2004 | Springer, Sr. | G06F 3/061 |
| 2005/0005070 A1* | 1/2005 | Lam | G06F 11/2064 711/135 |
| 2005/0066095 A1 | 3/2005 | Mullick et al. | |
| 2006/0155946 A1 | 7/2006 | Ji | |
| 2006/0242211 A1 | 10/2006 | Becker et al. | |
| 2007/0055833 A1 | 3/2007 | Vu | |
| 2007/0174669 A1 | 7/2007 | Ebata | |
| 2008/0281877 A1* | 11/2008 | Wayda | G06F 11/1435 |
| 2010/0042791 A1 | 2/2010 | Helman et al. | |
| 2011/0246733 A1 | 10/2011 | Usgaonkar | |
| 2011/0271067 A1* | 11/2011 | Chou | G06F 11/1448 711/162 |
| 2012/0254547 A1* | 10/2012 | Benhase | G06F 11/0727 711/133 |
| 2012/0311261 A1* | 12/2012 | Mizuno | G06F 3/0611 711/118 |
| 2013/0031058 A1* | 1/2013 | Adkins | G06F 17/30371 707/649 |
| 2013/0080695 A1 | 3/2013 | Beeken | |
| 2013/0138916 A1* | 5/2013 | Ohara | G06F 11/1456 711/217 |
| 2013/0325824 A1 | 12/2013 | Shoens | |
| 2014/0089264 A1 | 3/2014 | Talagala et al. | |

* cited by examiner

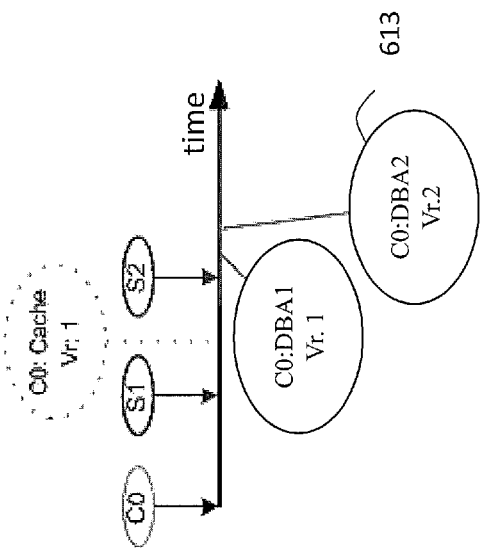
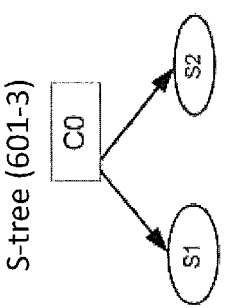
Figure 6c

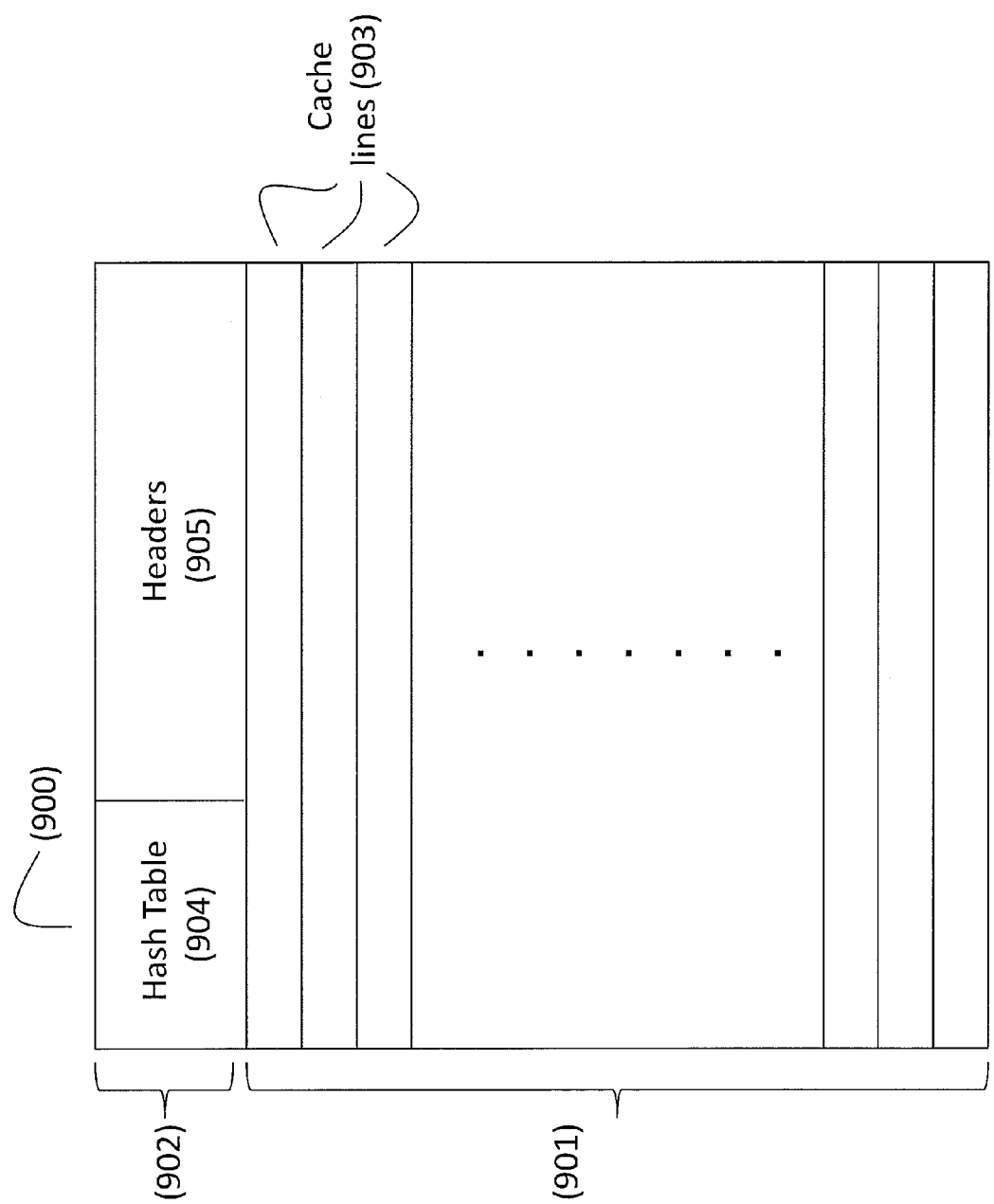

STORAGE SYSTEM CAPABLE OF MANAGING A PLURALITY OF SNAPSHOT FAMILIES AND METHOD OF OPERATING THEREOF

CROSS-REFERENCES TO RELATED APPLICATIONS

This application claims priority from U.S. Provisional Patent Application No. 61/730,988 filed Nov. 29, 2012 and relates to U.S. patent application Ser. No. 14/036,557 filed Sep. 25, 2013. Both U.S. 61/730,988 and U.S. Ser. No. 14/036,557 are incorporated herein by reference in their entireties.

TECHNICAL FIELD

The presently disclosed subject matter relates generally to systems and methods of storing data and, particularly, to methods of operating storage systems in the presence of a plurality of snapshots, and systems thereof.

BACKGROUND OF THE INVENTION

Modern storage systems are configured to enable providing copies of existing data for purposes of backup, possible restore in case of future data corruption, testing, etc. The copies may be provided with the help of backup and/or snapshot techniques.

The use of snapshot techniques greatly reduces the amount of storage space required for archiving large amounts of data.

Problems of operating storage systems in the presence of a plurality of snapshots have been recognized in the conventional art, and various techniques have been developed to provide solutions. For example:

US Patent Application No. 2011/0119459 (Satoyama et al.) discloses a storage system including a storage device which configures an original volume for storing data which is read/written by a host, a copy volume for storing a copy of the original volume at a predetermined timing, and a snapshot volume for storing a snapshot data which is a snapshot of the original volume; and a controller which controls access from the host to the storage device. The controller copies data of the original volume to the copy volume at a predetermined timing; stores the snapshot data in the snapshot volume corresponding to a write request to the original volume without decreasing a performance of the original volume; manages a generation of the stored snapshot according to predetermined copy volume blocks and snapshot volume blocks, and manages a generation of the copy volume; and reads data from the snapshot volume and/or the copy volume when a read request to a volume of a generation different from that of the original volume is received from the host, without decreasing a performance of the original volume.

US Patent Application No. 2008/172542 (Kaushik) discloses a method, apparatus and system of a hierarchy of a structure of a volume. In one embodiment, a system includes a physical volume, a structure to provide a mapping to a location of a data segment of the physical volume that may include a table having a hierarchy, a logical volume management module to define a logical volume as an arrangement of the physical volume, a snapshot module that may automatically generate a point-in-time image of the logical volume, may prompt the logical volume management module to create and insert a first table and a second table into the hierarchy of the structure, the first table may provide a set of updates to the logical volume, the second table may provide a set of updates to the point-in-time image, and a data processing system to perform a write IO operation and a read IO operation.

US Patent Application 2008/301203 (Adkins et al.) discloses an embodiment where at least one snapshot thread manages a point in time snapshot of a file system stored within the space allocated to the file system. The snapshot thread tracks, for at least one block of the plurality of blocks of the file system, a separate entry in a snapshot map specifying if each at least one block is newly allocated following the creation of the point in time snapshot and specifying an addressed location of a snapshot copy of the at least one block, if copied. Separately, a file system handling thread tracks a mapping of an allocation state of each of said plurality of blocks of the file system. Responsive to detecting the file system triggered to write or delete a particular block from among the at least one block of the file system, the snapshot thread allows the file system to write to or delete the particular block without making a snapshot copy of the particular block if a particular entry for the particular block in the snapshot map specifies the particular block is newly allocated, wherein a block marked newly allocated was not in-use at the point in time of the file system snapshot.

U.S. Pat. No. 6,038,639 (O'Brien et al.) discloses a data file storage management system for snapshot copy operations which maintains a two level mapping table enabling the data files to be copied using the snapshot copy process and only having to update a single corresponding mapping table entry when the physical location of the data file is changed. The snapshot copy updates to the contents of the first level of the two level mapping table, which are stored on the backend data storage devices to provide a record of the snapshot copy operation which can be used to recover the correct contents of the mapping table. This record of the snapshot copy operations remains valid even though the physical location of a copied data file instance is subsequently changed. Furthermore, the physical storage space holding the updated portions of the first level of the two level mapping table can be managed using techniques like those used to manage the physical storage space holding data file instances. Mapping table updates resulting from the snapshot copy operation are delayed until all mapping table updates resulting from earlier data file write operations have been completed and any attempt to update the mapping table to reflect data written to the original data file or the copy data file that occurs after initiation of the copy must wait until the first set of mapping table pointers have been copied.

U.S. Pat. No. 7,165,156 (Cameron, et al.) discloses a chain of snapshots including read-write snapshots descending from a read only snapshot. The read only snapshots present a constant view of the data at the time the read only snapshot is created, and the read-write snapshot starts with the view but can be modified by the user without changing the view of its parent snapshot (e.g., the read only snapshot). The read-write snapshot can be written for various testing purposes while the read only snapshot remains undisturbed to preserve the original data.

U.S. Pat. No. 8,145,865 (Longinov, et al.) discloses a technique when managing data transferred from a local storage device to a remote storage device includes maintaining the data in chunks in cache memory. Data writes to the local storage device begun during a particular time interval are associated with a chunk of data that is separate from other chunks of data and where data is transferred from the local storage device to the remote storage device by transferring a particular chunk after all data writes associated with the particular chunk have completed and after a previous chunk has been acknowledged as being received by the remote storage device and, in response to use of the cache memory exceeding a first threshold, storing data from a first chunk of the cache memory to a local disk. Data writes to the local storage device may be provided by a host coupled to the local storage device.

US Patent Application No. 2003/0182313 (Federwisch, et al.) discloses a technique for generating a group of changes in a source file system snapshot pair for transmission to a replicated destination file system comprising: a scanner that searches a respective logical block file index of each of a first snapshot and a second snapshot of the source file system according to a predetermined file index and that retrieves only blocks having volume block numbers at corresponding file index locations on each of the first snapshot and the second snapshot that have different volume block numbers; and wherein the scanner is adapted to walk down a hierarchy of pointers associated with each respective logical block file index and retrieve only pointed-to blocks with changed volume block numbers relative to pointed-to blocks at corresponding file offsets while bypassing blocks having unchanged volume block numbers therebetween.

GENERAL DESCRIPTION

In accordance with certain aspects of the presently disclosed subject matter, there is provided a method of identifying delta-data between two points-in-time, the method to be used when operating a storage system comprising a control layer with a cache memory and operable to manage a snapshot family (SF) constituted by hierarchically related SF members and mapped by a SF mapping data structure configured to provide logical-to-physical mapping for SF members. The method comprises generating successive snapshots Si and Si+1 corresponding to the two points-in-time. Upon generating the snapshot Si+1, the method comprises searching the cache memory for data blocks associated with snap_version identifier indicative of snap_version=i, thereby yielding cached delta-metadata, wherein snap_version identifier associated with a given data block is indicative of the latest SF member existing at the time of writing the given data block to the cache memory; searching the SF mapping data structure for destaged data blocks associated with snap_version identifier indicative of snap_version=i, thereby yielding destaged delta-metadata, wherein the SF mapping data structure is configured to associate a given physical address with snap_version identifier indicative of the latest snapshot existing at the time of writing to the cache memory data corresponding, when destaged, to the given physical address; and joining the cached delta-metadata and the destaged delta-metadata, thereby yielding delta-metadata indicative of the delta-data between points-in-time corresponding to the successive snapshots with Snap_ID=i and Snap_ID=i+1.

In accordance with other aspects of the presently disclosed subject matter, there is provided a storage system comprising a control layer and a cache memory therein, the control layer configured to manage a snapshot family (SF) constituted by hierarchically related SF members and mapped by a SF mapping data structure configured to provide logical-to-physical mapping for SF members. The control layer is further configured to identify delta-data between two points-in-time by providing at least the following: generating successive snapshots Si and Si+1 corresponding to the two points-in-time; upon generating the snapshot Si+1, searching the cache memory for data blocks associated with snap_version identifier indicative of snap_version=i, thereby yielding cached delta-metadata, wherein snap_version identifier associated with a given data block is indicative of the latest SF member existing at the time of writing the given data block to the cache memory; searching the SF mapping data structure for destaged data blocks associated with snap_version identifier indicative of snap_version=i, thereby yielding destaged delta-metadata, wherein the SF mapping data structure is configured to associate a given physical address with snap_version identifier indicative of the latest snapshot existing at the time of writing to the cache memory data corresponding, when destaged, to the given physical address; and joining the cached delta-metadata and the destaged delta-metadata, thereby yielding delta-metadata indicative of the delta-data between points-in-time corresponding to the successive snapshots with Snap_ID=i and Snap_ID=i+1.

In accordance with further aspects of the presently disclosed subject matter, the control layer can be further configured: to assign to each cache mapping entry in the cache memory a constantly updated first value indicative of the highest snap_version identifier out of snap_version identifiers associated with data blocks mapped by the respective entry; and to search the cache memory for data blocks associated with snap_version identifier indicative of snap_version=i solely in cache mapping entries with assigned first value indicative of snap_version≥i.

In accordance with further aspects of the presently disclosed subject matter, the control layer can be further configured: to assign to each SF mapping entry in the SF mapping data structure a constantly updated second value indicative of the highest snap_version identifier out of snap_version identifiers associated with data blocks mapped by the respective entry; and to search the SF mapping data structure for data blocks associated with snap_version identifier indicative of snap_version=i solely in SF mapping entries with assigned second value indicative of snap_version≥i.

In accordance with further aspects of the presently disclosed subject matter, the SF mapping data structure can be configured as an ordered mapping tree comprising a plurality of nodes, and the control layer can be further configured: to assign to each given node in the mapping tree a third value indicative of the highest snap_version identifier out of all snap_version identifiers associated with all data blocks mapped by all leaves represented by nodes below the given node; responsive to destaging a data block associated with a snap_version identifier indicative of snap_version=k, k greater than the third value, to update third value assigned to a representing node that represents a leaf mapping the data block to become equal to k; and to traverse up the mapping tree and successively updating third values assigned to each node above the representing node to become equal to k, and stopping updating at a first with assigned third value not less than k.

In accordance with further aspects of the presently disclosed subject matter, the control layer can be further configured to search the SF mapping data structure for data blocks associated with snap_version identifier indicative of snap_version=i by providing at least the following: traversing down the mapping tree starting from a root node and successively comparing for each node the associated third value with snap_version=i value; for representing nodes with associated third value not less than snap_version=i value, identifying in the represented leaves data blocks associated with snap_version=i, thereby yielding delta-metadata for respective leaves; stopping traversing at a first node with assigned third value lower than i; and joining delta-metadata for respective leaves thereby yielding the destaged delta-metadata.

In accordance with further aspects of the presently disclosed subject matter, the control layer can search the SF mapping data structure for destaged data blocks over data blocks accessible for access requests received from one or more hosts. Thus, among advantages of certain embodiments of the presently disclosed subject matter is capability to provide incremental asynchronous mirroring with no need in special handling (e.g. copying and/or destaging to a dedicated location) data that needs to be transmitted to the RS system.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 6a-6j illustrate non-limiting examples of evolution of an S-tree, a clone line table and of MVE data structure in correspondence with events related to the snapshot family illustrated in FIGS. 2-3;

FIGS. 9a and 9b illustrate a non-limiting example of a cache memory in accordance with certain embodiments of the presently disclosed subject matter;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "sending", "determining", "generating", "identifying", "searching" or the like, refer to the action and/or processes of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, storage system and parts thereof (e.g. control layer and parts thereof) disclosed in the present application.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

The references cited in the background teach many principles of storage systems operation that may be applicable to the presently disclosed subject matter. Therefore the full contents of these publications are incorporated by reference herein where appropriate for appropriate teachings of additional or alternative details, features and/or technical background.

It is to be understood that the term "non-transitory" is used herein to exclude transitory, propagating signals, but to include, otherwise, any volatile or non-volatile computer memory technology suitable to the presently disclosed subject matter.

Figure 1:
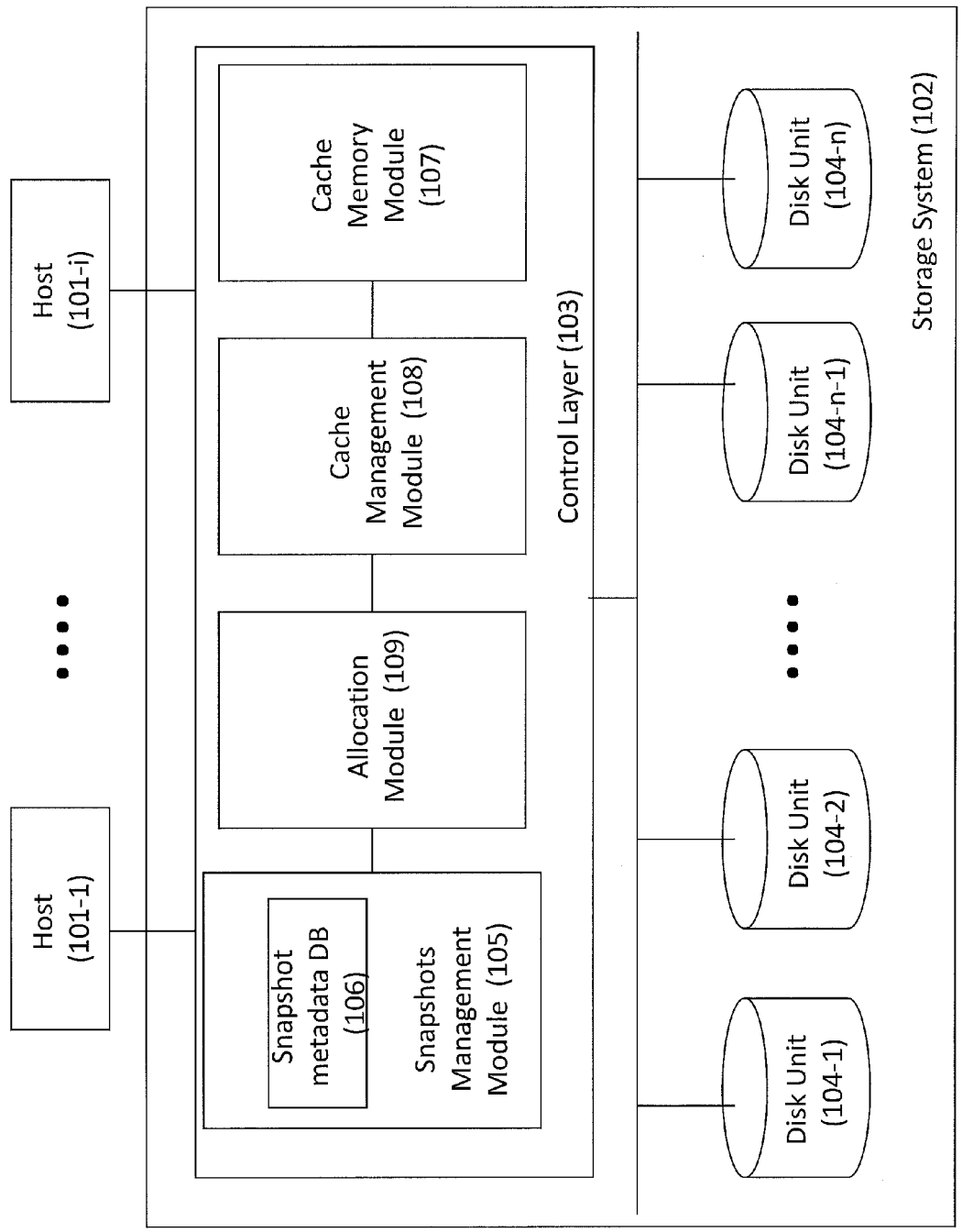
FIG. 1 illustrates a schematic functional diagram of a mass storage system in accordance with certain embodiments of the presently disclosed subject matter.

Bearing this in mind, attention is drawn to FIG. 1 illustrating a non-limiting example of a schematic functional diagram of a mass storage system in accordance with certain embodiments of the presently disclosed subject matter.

The illustrated mass storage system 102 provides common storage means to be shared by a plurality of host computers (illustrated as 101-1-101-n). The storage system comprises a control layer 103 comprising one or more appropriate storage control devices operatively coupled to the plurality of host computers and operable to control access operations between the plurality of host computers and a plurality of data storage devices (e.g. a plurality of physical disk drives (PD) organized in one or more arrays illustrated as disk units 104-1-104-n). The storage devices constitute a physical storage space optionally distributed over one or more storage nodes, wherein the storage control layer is operable to control interface operations (including access operations) between the host computers and the storage physical space. The storage system is configured in a manner enabling direct or indirect servicing a request directed at any available address in the physical storage space.

The physical storage space can comprise any appropriate permanent storage medium and can include, by way of non-limiting example, a plurality of physical disk drives (PD) organized in one or more arrays (illustrated as disk units 104-1-104-n). The physical storage space comprises a plurality of data blocks, each data block being characterized by a pair ($DD_{id}$, DBA), and where $DD_{id}$ is a serial number associated with the physical disk drive accommodating the data block, and DBA is a logical block number within the respective disk. By way of non-limiting example, $DD_{id}$ may represent a serial number internally assigned to the physical disk drive by the system or, alternatively, a WWN or universal serial number assigned to the disk drive by a vendor.

Stored data can be logically represented to a client in terms of logical objects. Depending on storage protocol, the logical objects may be logical volumes, data files, multimedia files, snapshots and other copies, etc. For purpose of illustration only, the following description is provided with respect to logical objects represented by logical volumes.

A logical volume (LV) is a virtual entity logically representing a plurality of data blocks and acting as basic units for data handling and organization within the system. Logical volumes are characterized by successive Logical Block Addresses (LBA) ranging from 0 to a number K, wherein K is the number of data blocks comprised in the logical volume. Different LVs may comprise different numbers of data blocks, while the data blocks are typically of equal size (e.g. 512 bytes).

The same logical volume can be exposed to the outside world as one or more uniquely addressable logical units, each appearing as a single virtual storage device to hosts, file systems, databases, and other application programs. Each logical unit can be characterized by a logical unit identifier (e.g. a logical unit number, or LUN), used to identify the logical unit when addressed by the SCSI protocol or protocols which encapsulate SCSI, such as, for example, Fibre Channel or iSCSI. LUN numbers can be assigned to the logical units in accordance with an addressing scheme. By way of non-limiting example, in a multiple port storage array, a logical volume can be assigned a different LUN on each port through which the logical volume is accessed. Optionally, an external management server (not shown in FIG. 1) can keep a list of which LUNs each host and/or application is allowed to access.

When receiving a write request from a host, the storage control layer identifies a physical location(s) designated for writing the respective data. Similarly, when receiving a read request from the host, the storage control layer identifies the physical location(s) of the desired data portion(s) and further processes the request accordingly. The storage control layer further issues updates of a given data object to all storage nodes which physically store data related to the data object. The storage control layer is further operable to redirect, if required, the request/update to storage device(s) with appropriate storage location(s) irrespective of the specific storage control device receiving the access request.

The control layer further comprises a snapshot management module 105. The functions of the snapshot management module include managing the snapshots and groups thereof.

A snapshot logical volume (referred to hereinafter also as a "snapshot") is a logical entity representing a virtual copy of a source logical volume as it existed at the time of creating the snapshot. As will be further detailed with reference to FIGS. 2-3, a given snapshot (referred to hereinafter as a parent snapshot) can serve as a source volume for one or more further snapshots (referred to hereinafter as child snapshots). Each snapshot has one source logical volume (initial logical volume or a parent snapshot). A given logical volume at a starting point-in-time (referred to hereinafter as a master logical volume) and the snapshots corresponding thereto and created at different later points-in-time constitute a snapshot family associated with the given master logical volume. It is noted that starting point-in-time is configurable and any writable snapshot can be selected as a master volume of the snapshot family constituted by the master volume and its descendant snapshots. The master logical volume and the snapshots corresponding thereto are referred to hereinafter as snapshot family members. Some of the snapshots in the snapshot family can be writable, while other snapshots can be configured as read-only snapshots. The hierarchical relationship (e.g. siblings, parents, grandparents, siblings of a parent, descendants (children), etc.) between the members of the snapshot family can be represented as a tree with one or more branches.

For purpose of illustration only, in the following description a snapshot family corresponds to a given logical volume. Those skilled in the art will readily appreciate that the teachings of the present disclosure are applicable in a similar manner to a snapshot family corresponding to other appropriate logical groups (e.g. snapshots created at different point in time for a consistency group of logical volumes, for one or more virtual partitions, or for other logical objects).

A snapshot is usually implemented by using pointers. Any newly created snapshot shares data with the source logical volume with the help of pointers constituting a part of the system metadata. Hence, at the time of creation, the new snapshot consumes physical resources merely for storing related metadata, and no additional physical resources are required for storing data associated with the snapshot logical volume. Only when a portion of either the source or its respective snapshot is modified, new data is created and, accordingly, new physical resources are allocated to this data in the disks.

Each of the snapshot family's members comprises the same number of logical blocks. In order for either the source volume or the snapshot to be addressable from an external host via a SCSI command, a LUN has to be defined, thus enabling connection between a port in the host and the volume or snapshot via a respective port in the storage system. The information about the defined LUNs is stored as a part of the system metadata. Access requests (e.g. write requests, read requests, etc. are addressed to the LUN with specified ranges of LBAs. The storage system can interpret the request so that it will be addressed to the intended source volume or snapshot.

Metadata related to snapshot management can be managed by the snapshot management module 105 and accommodated at a dedicated location(s) in the storage devices and/or in a non-volatile memory comprised in the control layer (e.g. implemented as snapshot metadata database 106 of the snapshot management module). A copy of the snapshot metadata can further reside in the volatile memory. By way of non-limiting example, the metadata accommodated in connection with snapshots management can include the snapshot volume identifiers (e.g. Snap_ID, Snap_LUN, etc.), flags indicating various states related to the snapshot (e.g., in use, delete in progress, marked for deletion, delete complete, etc.), size of snapshot volumes, and other snapshot related metadata.

The storage control layer 103 further comprises a volatile cache memory 107 for temporarily storing the data to be written to the storage devices in response to a write request and/or for temporarily storing the data to be read from the storage devices in response to a read request. In accordance with certain embodiments of the presently disclosed subject matter, the control layer further comprises a cache management module 108 operatively connected to the cache memory and to the snapshot management module 105.

Upon receiving by the control layer a read request specifying LBA to be read, the cache management module determines whether the respective data is presently contained within the cache. If the determination indicates that the addressed block is presently within the cache, then a cache hit occurs and the data can be transferred from the cache to the host. On the other hand, if the check indicates that the requested data is not within the cache, then a cache miss occurs, and the respective data is read from a storage device. Managing cache "hit" or "miss" determination in accordance with certain embodiments of the presently disclosed subject matter is further detailed with reference to FIGS. 7-10.

During the write operation the data is temporarily retained in cache memory 107 until subsequently written to one or more data storage devices. Such temporarily retained data, modified in cache and not modified in the storage devices, is referred to hereinafter as "dirty data". Once the dirty data is sent to the respective nonvolatile storage medium, its status is changed to "non-write-pending", and the storage system relates to this data as stored at the nonvolatile storage medium and allowed to be erased from the cache memory. Such data is referred to hereinafter as "clean data".

Optionally, the control layer can further comprise (not shown) a first virtual layer operable to represent the logical address space, the first virtual layer characterized by a plurality of virtual unit addresses (VUA). Alternatively or additionally, the control layer can further comprise a second virtual layer operable to represent the physical storage space, the second virtual layer characterized by a plurality of virtual disk addresses (VDA). By way of non-limiting example, respective architecture and operation of the control layer is detailed in International Patent Application No. WO 2010/092576 assigned to the Assignee of the present application and incorporated thereto by reference in its entirety.

Mapping between logical addresses (LBA addresses, VUA addresses) and physical addresses (VDA addresses, DBA addresses) can comprise at least one of the mapping options:
 a) mapping between LBA addresses and DBA addresses;
 b) mapping between VUA addresses and VDA addresses;
 c) mapping between LBA addresses and VDA addresses; and
 d) mapping between VUA addresses and DBA addresses.

For purpose of illustration only, in the following description the mapping is presented between LBA addresses and DBA addresses. Those skilled in the art will readily appreciate that the teachings of the present disclosure are applicable in a similar manner to other mapping options between logical addresses and physical addresses.

The control layer further comprises an allocation module 109 operatively coupled to the snapshot management module 105 and the cache management module 108. The allocation module 109 can be configured to handle one or more mapping data structures, each assigned to a respective given snapshot family and operable to provide mapping between one or more contiguous ranges of logical addresses within logical address space of the given snapshot family and physical addresses corresponding to a snapshot family member specified in an access request. Such data structure is referred to hereinafter as a snapshot family mapping data structure and is further detailed with reference to FIGS. 4-10.

The snapshot management module, the cache memory, the cache management module and the allocation module are operatively connected, configured to facilitate operations in accordance with the presently disclosed subject matter as further detailed with reference to FIGS. 2-10 and each can be implemented in any appropriate combination of software, firmware and hardware. The snapshot management module, the allocation module, the cache memory and/or the cache management module can be implemented as centralized modules operatively connected to the plurality of storage control devices or can be, at least partly, distributed over some or all storage control devices.

Those versed in the art will readily appreciate that the teachings of the presently disclosed subject matter are not bound by the system illustrated in FIG. 1, equivalent and/or modified functionality can be consolidated or divided in another manner and can be implemented in any appropriate combination of software, firmware and hardware.

Figure 2:
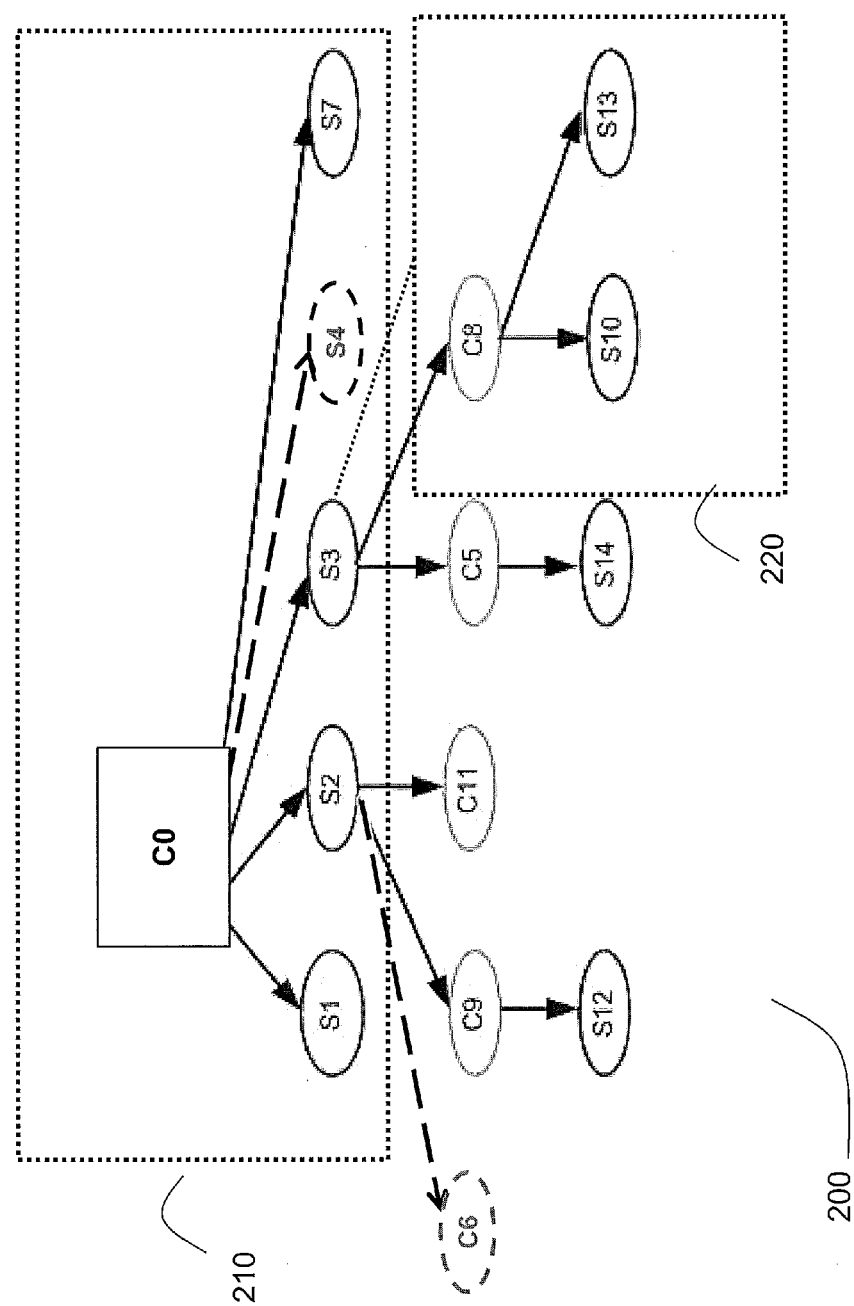
FIG. 2 illustrates an exemplary snapshot family represented by a snapshot tree.

FIG. 2 illustrates an exemplary snapshot family represented by a snapshot tree (referred to hereinafter also as S-tree). The illustrated S-tree 200 represents the relationship between a master logical volume C0 and its snapshots. Unless specifically stated otherwise, it is appreciated that throughout the specification the following terms should be construed as following:

Family_ID denotes an identifier associated with the entire snapshot family including a master volume constituting a root of a respective snapshot family and its descendant snapshots. Members of the snapshot family are denoted by letter S indicative of read-only snapshots or by letter C indicative of the master volume or writable snapshots (also referred to hereinafter as clones). The members of the snapshot family are further denoted by a snapshot identifier, Snap_ID, which uniquely identifies a specific snapshot member within the snapshot family and is further indicative of the order of creation of the member. The snapshot identifier may be, for example, a running index associated with the respective members according to their order of creation, etc. A snapshot identifier of an earlier created member is smaller than a snapshot identifier of a later created snapshot. Referring to S-Tree 200, snapshot S10, for example, was created before S12, S13, S14 and C11 (even though the latter resides in a higher hierarchy level in the tree than the hierarchy level of S10). The master volume is denoted as C0.

It is noted that if writable snapshots are not supported, the S-tree only includes C0 as the root with all the snapshots residing at the same level next to C0.

By way of non-limiting example, the illustrated snapshot family is generated in a manner that read-only snapshots are generated as children of writeable snapshots (clones), and the clones are generated as children of read-only snapshots, i.e. a parent of a read-only member is always a writable member of the snapshot family.

In the illustrated S-tree, the writable master volume C0 has direct read-only children S1, S2, S3, S4 and S7. Snapshots C5, C8, S14, S10 and S13 are descendants of S3 while S10 and S13 are children of C8; C6, C9, C11 and S12 are descendants of S2 while S12 is a child of C9. Dashed lines for S4 and C6 denote that these snapshots have been deleted.

S-tree 200 is updated (e.g. by the snapshot management module) each time a snapshot in the family is created, removed or restored.

In accordance with certain embodiments of the presently disclosed subject matter, each node of the S-Tree can be associated with information relating to a respective member of the snapshot family: e.g. references to an older sibling in the S-tree, references to a younger sibling, parent, descendants, read-only flag, etc. Fast access to the nodes in the S-Tree can be enabled by maintaining a Snapshot Lookup Table. Optionally, a separate look-up table can be assigned to each snapshot family. The Snapshot Lookup Table is characterized by Snap_ID as a key, and a pointer to the location of the respective node in memory as the lookup value.

A group of snapshots, constituted by a writable member and one or more generations of read-only children with no writable member between the generations, is referred to hereinafter as an inheritance cluster. For example, in the illustrated S-tree 200, an inheritance cluster 210 includes the master volume C0 and read-only snapshots S1, S2, S3, S4 and S7. An inheritance cluster can be further associated with a direct parent of its writable member, this direct parent can serve as a link to an upper level inheritance cluster. For example, an inheritance cluster 220 includes the writable member C8, its read-only descendants S10 and S13. The inheritance cluster 220 is further associated with S3, the read-only parent of the writable member C8, which links between cluster 220 and the upper inheritance cluster 210.

Each writable member of the snapshot family can be associated with a corresponding inheritance cluster. A sequential relationship between the members of a given inheritance cluster can be represented by a column in a clone line table, such a column being referred to hereinafter as a clone line. The clone line table comprises one or more clone lines, one clone line for each writeable family member. A clone line of a given writable family member (such member being referred to hereinafter also as a parent clone) comprises a sequence of the parent clone and read-only members of a respective inheritance cluster, the sequence order being in accordance with respective creation time. The clone line further comprises a value indicative of the direct parent of the parent clone, this direct parent associated with the respective inheritance cluster and linking the cluster to the upper levels in the S-tree.

Figure 3:
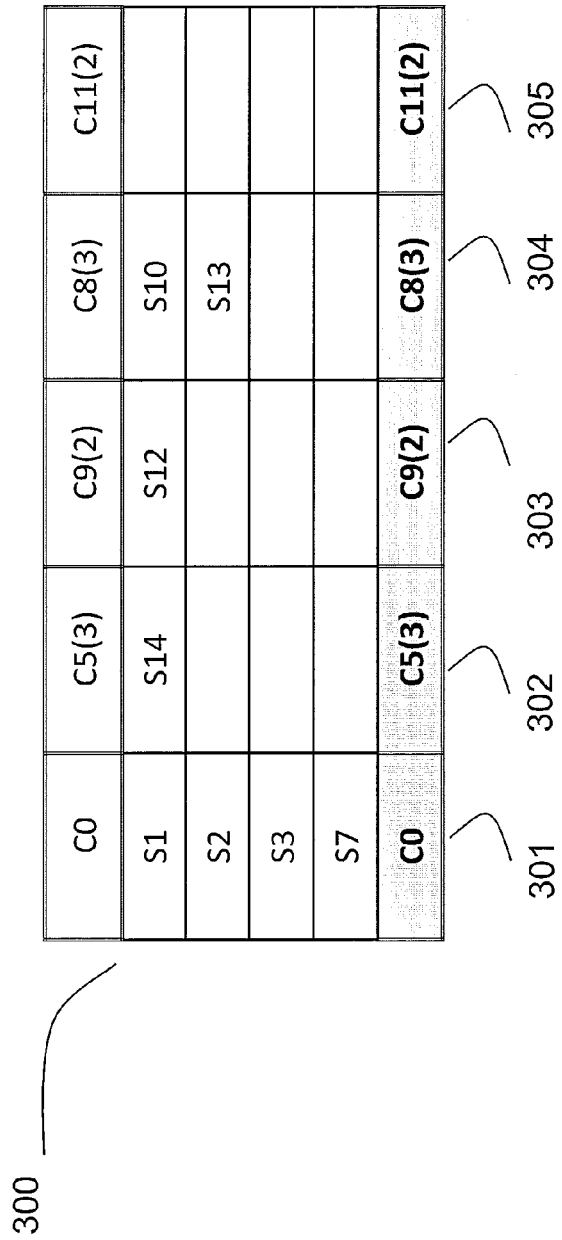
FIG. 3 illustrates an exemplarily clone line table corresponding to the exemplary S-tree illustrated in FIG. 2.
Figure 4:
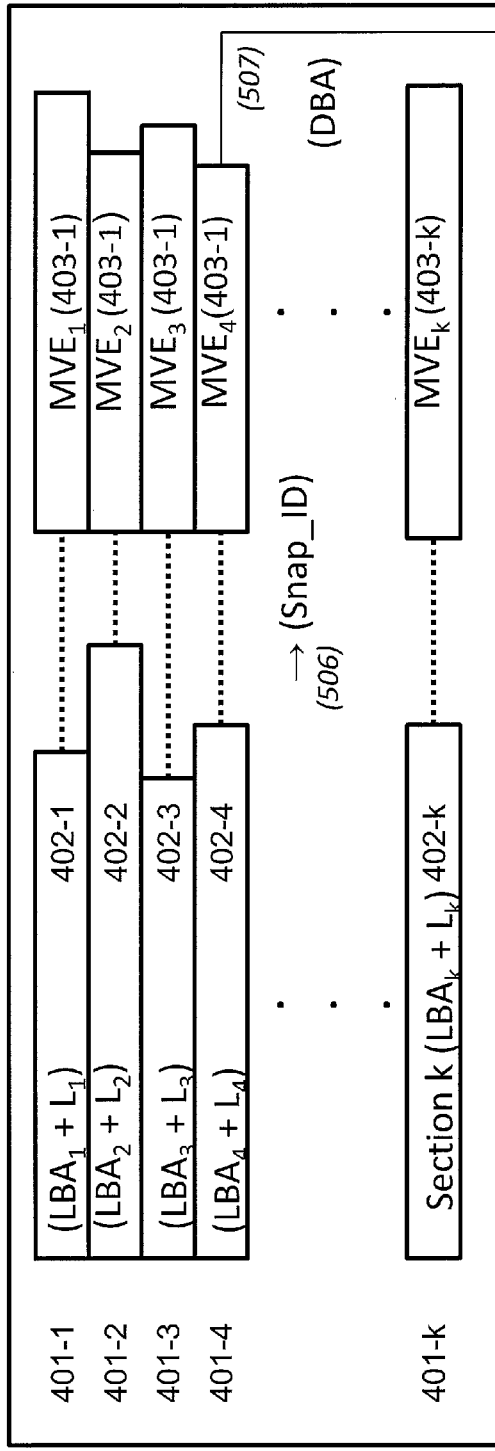
FIG. 4a illustrates a snapshot family mapping data structure configured in accordance with certain embodiments of the presently disclosed subject matter.
FIG. 4b illustrates an exemplary MVE data structure corresponding to a given LBA range in the snapshot family illustrated in FIGS. 2 and 3.

An exemplary clone line table 300 corresponding to the S-tree 200 is illustrated in FIG. 3. The numbers in brackets in the first elements of the clone lines are indicative of direct parents of respective parent clones.

For example, the clone line 301 corresponds to the inheritance cluster 210. The clone line comprises the master volume C0 as a parent clone and the read-only snapshots S1, S2, S3 and S7 being the direct children of the master volume. The snapshot S1 has been created before the snapshot S2; the snapshot S3 has been created after the snapshot S2 but before the snapshot S7. The clone line 302 with the parent clone C5 further comprises the read-only snapshot S14. The value in brackets indicates that the clone C5 is the direct child of S3. The clone line 303 with the parent clone C9 comprises the read-only snapshot S12. The value in brackets indicates that the clone C9 is the direct child of S2. The clone line 304 with the parent clone C8 corresponds to the inheritance cluster 220 and further comprises the read-only snapshots S10 and S13 being the direct children of the clone C8. The value in brackets indicates that the clone C8 is the direct child of S3. The clone line 305 with the parent clone C11 does not comprise any direct child. The value in brackets indicates that the clone C11 is the direct child of S2.

Optionally, in addition to the sequence of a parent clone and its read-only children, a clone line can be configured to comprise the parent clone also as a last element, thereby enabling traversing the table in a hierarchical manner. It is appreciated that throughout the following specification a parent clone is considered as a first and a last element in a respective clone line.

Likewise the S-tree, the clone-line table is updated (e.g. by the snapshot management module) each time a snapshot in the family is created, removed or restored.

FIG. 4a illustrates a snapshot family mapping data structure (referred to hereinafter also as SFM data structure or SFM) configured in accordance with certain embodiments of the presently disclosed subject matter.

Each snapshot family is provided (e.g. by the allocation module 109 in cooperation with the snapshot management module 105) with a snapshot family mapping data structure assigned thereto. Family_ID of a snapshot family is also indicative of the assigned SFM data structure.

For each access request addressed to a member of given snapshot family, the SFM data structure is operable to provide mapping between the request (LUN, LBAx, length) specifying an addressed LUN, an offset $LBA_x$ and a length of the required LBA range and physical addresses corresponding to the request. Thus, the entire snapshot family is mapped to physical addresses corresponding to different family members with the help of the SFM data structure associated with that family.

In accordance with certain embodiments of the presently disclosed subject matter, each family is characterized by a snapshot family logical address space (also referred to hereinafter as SF logical address space). The size of SF logical address space is equal to the size of any of the family members' logical volumes, while a given offset in the SF logical address space corresponds to the same offset in any one of the family member volumes. By way of non-limiting example, an offset LBAx in the SF logical address space corresponds to offset LBAx in an access request (LUN1, LBAx, length1) addressed to a snapshot family member and to LBAx in an access request (LUN2, LBAx, length2) addressed to another member of the same snapshot family.

The SFM data structure 400 includes one or more entries (illustrated as 401-1-401-k), each entry corresponding to a certain variable-length range of contiguous logical addresses within the SF logical address space. A range of logical addresses is contiguous in a SF logical address space, if this range is contiguous in any one of the members of respective snapshot family. Each mapping entry maps a different range of logical addresses and different entries may map a different size of range.

Each entry is characterized by a value indicative of offset in SF logical address space and length of a contiguous LBA range corresponding to the entry (illustrated, respectively, as 402-1-402-k) within the snapshot family logical address space. For example, a certain entry can correspond to logical address range 0-64 Kbyte (i.e. address range of 64K length with zero offset in the SF logical address space), while the next entry can correspond to the logical address range 64 Kbyte-1024 Kbyte (i.e. address range of 960K length with offset=64K in the SF logical address space). It is noted that lengths of contiguous LBA ranges corresponding to the entries are defined in multiples of fixed-length (e.g. 64 Kb) LBA data range. For purpose of illustration only, the access operations are further described herein in terms of entire data portions being multiples of the data blocks corresponding to this fixed-length LBA data range. Those skilled in the art will readily appreciate that the teachings of the presently disclosed subject matter are applicable in a similar manner to partial data portions.

Each entry is further configured to comprise one or more mappings for mapping an LBA range associated with the mapping entry into one or more physical address ranges respectively correlated to one or more members of the snapshot family. Each of the mappings correlates a physical address range to a member of the family, for example, by including in the mapping entry a tuple of physical address range and the correlated member. Other correlation techniques may be used, for example: the mapping entry can include a list of physical address ranges and a bitmap that indicates which family member has a corresponding physical address range, for example, a set bit indicates that the corresponding member is correlated with a physical address range that is included in the entry, wherein the first set bit correlates the corresponding member to the first physical address range in the list of physical address ranges.

By way of non-limiting example, the mappings for a given entry can be provided by a data structure (illustrated, respectively, as 403-1-403-k) associated with the entry and configured to provide mapping between LBA range corresponding to the entry and range of physical addresses assigned to different members of the snapshot family. Such data structure is referred to hereinafter as a multiple value entry (MVE) data structure or MVE.

As will be detailed further with reference to FIG. 4b, a given MVE data structure 403-k provides, for contiguous LBA range 402-k in a SF logical address space, association between members in the snapshot family and values indicative of DBA ranges assigned to these members.

The length of the contiguous LBA range can vary from entry to entry in the SFM data structure. The length of contiguous LBA range in a given entry and/or its offset in SF logical address space can also vary depending on different (e.g. write, delete, etc.) operations provided with regard to the logical address space of the snapshot family. Responsive to transferring a certain LBA range from one SFM entry to another, respective Snap_ID→DBA mapping data can be transferred to MVE data structure associated with another SFM entry.

Figure 5:
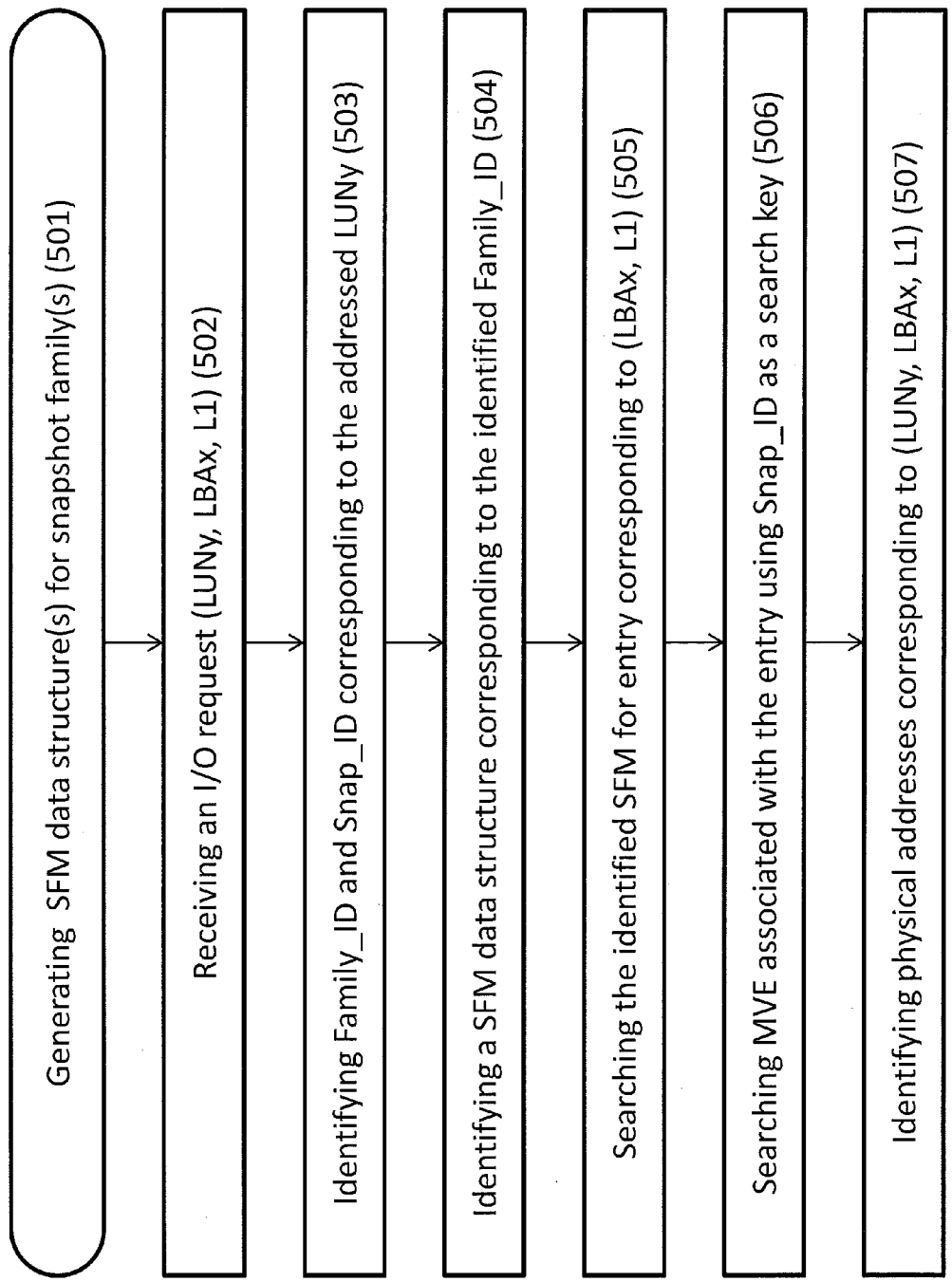
FIG. 5 illustrates a generalized flow chart of identifying physical addresses of data specified in an I/O request addressed to a given LUN in accordance with certain embodiments of the presently disclosed subject matter.

Referring to FIG. 5, there is illustrated a generalized flow chart of identifying physical addresses of data specified in an access request addressed to a given LUN in accordance with certain embodiments of the presently disclosed subject matter.

Each snapshot family is provided (e.g. by the allocation module 109 in cooperation with the snapshot management module 105) with a corresponding SFM data structure. Upon receiving an access request (LUNy, LBAx, L1) (502) addressed to a snapshot family member corresponding to LUNy, the control layer (e.g. using the snapshot management module 105) identifies (503) Family_ID and Snap_ID corresponding to the addressed LUNy. It is noted, that access request can be addressed only to snapshots with assigned LUNs.

The control layer further identifies (e.g. using the allocation module 109) a snapshot family mapping data structure corresponding to the identified Family_ID (504) and uses the LBA range specified in the request for searching (505) the identified SFM for entry corresponding to this LBA range (i.e. entry corresponding to the range LBAx, L1 within the SF logical address space).

For purpose of illustration only, in the following description access requests are addressed to LBA ranges corresponding to a single SFM entry. Those skilled in the art will readily appreciate that the teachings of the present disclosure are applicable in a similar manner to any addressed LBA range (e.g. an access request addressing LBA ranges in several SFM entries can be handled as several access requests, each addressing LBA range in a single entry).

The control layer further uses Snap_ID as a key for searching (506) MVE associated with the found entry for identifying (507) the physical addresses corresponding in the addressed member of the snapshot family to the requested LBA range. By way of non-limiting example, searches 505, 506 and 507 can be provided by the allocation module 109.

Referring back to FIG. 4a, by way of non-limiting example, a snapshot family mapping data structure can be configured as a mapping tree. The mapping tree can be configured as an ordered tree data structure comprising one or more leaves. For example, the tree can be configured in a manner detailed in US Patent Application No. 2011/0082997 assigned to the Assignee of the present application and incorporated herewith by reference in its entirety. A depth of a leaf in the tree can represent a length of contiguous range of logical addresses represented by the leaf, a path followed from a tree root to the leaf can indicate an offset of the range of addresses within the snapshot family logical address space; and MVE associated with the leaf can indicate corresponding DBA ranges assigned to different members of the snapshot family. Accordingly, the control layer can traverse the tree in order to find a leaf corresponding to the requested LBA range and further use MVE associated with the leaf for identifying DBA range corresponding to the addressed Snap_ID.

Referring to FIG. 4b, there is illustrated an exemplary MVE corresponding to a given LBA range in the snapshot family illustrated with reference to FIGS. 2 and 3.

The illustrated MVE data structure 404 provides, for a given LBA range, association between two multi-value entries: snapshots entry 405 comprising values (e.g. respective Snap_ID) indicative of members in the snapshot family and physical storage entry 406 comprising values indicative of DBA ranges corresponding to the values in the snapshots entry 405.

A given physical address range can be shared by more than one family member. Each value in the physical storage entry 406 corresponds to a physical address range assigned to one or more snapshot family members sharing the same physical addresses corresponding to the given LBA range.

The MVE data structure can be configured to present a given DBA range by one or more family members (referred to hereinafter as representative members) sharing the given DBA range, whilst to omit from the snapshot entry at least one family member (referred to hereinafter as an omitted member) sharing the given DBA range and different from any of the representative members.

In accordance with certain embodiments of the presently disclosed subject matter, the MVE data structure can be configured to provide uniqueness of presenting a given DBA range, i.e. the given DBA range shared by several family members is presented in the MVE data structure only once in association with one and only one family member among the family members sharing the respective DBA range. The rest of the family members sharing the same DBA range can be identified in accordance with pre-defined rules by using the MVE and data informative of the hierarchical and sequential relationship of the members in the snapshot family (e.g. S-tree and/or clone lines data structures).

For example, if all members sharing the same range of physical addresses are members of the same inheritance cluster (e.g. comprised in the same clone line), the snapshot entry of MVE data structure can include only the earliest created among them. If the members sharing the same range of physical addresses belong to a different inheritance cluster (e.g. comprises different clone lines), the snapshot entry of MVE data structure includes only the latest created member in the earliest created (i.e. upper layer) inheritance cluster.

In the illustrated non-limiting example, the master volume C0 has been modified after creation of the snapshots S1, S2 and S3 in the clone line 301, while there was no further modification of the master volume upon creating the snapshot S7. Accordingly, the snapshot S7 shares the range of physical addresses with the master volume C0, and snapshot entry 405 of the illustrated MVE data structure 404 does not comprise value indicative of S7, and a request addressed S7 or C0 will be mapped to the same DBA6 range.

In the illustrated non-limiting example, the parent clone C8 has been modified after the snapshot S13 has been created. The value in the physical storage entry corresponding to S13 (specified as "pass") is indicative that the respective snapshot does not share data with the modified parent and DBA range corresponding to the snapshot is presented by a snapshot from an upper level inheritance cluster.

In the illustrated example the physical address range corresponding to snapshot S1 has been unmapped (or, optionally, has been never written or allocated). The corresponding value in the physical storage entry is specified as "free".

Those versed in the art will readily appreciate that uniqueness of presenting a shared DBA range in MVE by one and only one family member among the family members sharing the same DBA range can be implemented in a manner other than illustrated with reference to FIG. 4b.

SF mapping data structure and elements thereof are updated responsive to different destaging event as, for example, destaging data received in a write request, destaging data in conjunction with snapshots removal, restoring or un-mapping, etc.

In accordance with certain embodiments of the presently disclosed subject matter, the control layer is configured (e.g. with the help of the snapshot management module) to recognize a current snapshot identifier indicative of the most recent snapshot and to associate data to be cached with the latest snapshot identifier existing at the time of writing a given data portion to a cache memory. Such snapshot identifier associated with the cached data is referred to hereinafter as Snap_version and is indicative of the latest snapshot existing at the time of writing a given data portion to a cache memory.

As will be further detailed with reference to FIGS. 6-13, the MVE data structure can be further configured to comprise snap_version multi-value entry (not shown) configured to provide association between DBAs in the physical storage entry 406 and snap_version indicative of the latest snapshot existing at the time of writing to the cache memory respective data portions corresponding to DBAs when destaged.

FIGS. 6a-6j illustrate non-limiting examples of evolution of an S-tree (from 601-1 to 601-10), a clone line table (from 603-1 to 603-10), a mapping table (from 604-1 to 604-10) indicative of DBA assignments for family members and of MVE data structure (from 605-1 to 605-10) in correspondence with events related to the snapshot family and illustrated in a timeline of events (from 602-1 to 602-10). Each MVE data structure also comprises snap_version entry associating DBAs in the physical storage entry and snap_version indicative of the latest snapshot existing at the time of writing to the cache memory respective data portions corresponding, when destaged, to DBAs. It is noted that mapping table 604 represents all family members corresponding to specified DBA range and is used for illustration only, while the MVE data structure 605 enables uniqueness of presenting a given shared DBA range by one and only one family member and is a part of SFM data structure stored and maintained in the storage system. In a mass-storage system a snapshot family can comprise thousands, or even several thousands of snapshots. Using the MVE data structure (preferably MVE data structure with uniqueness of presenting a given shared DBA range) instead of a mapping table representing all family members allows increasing effectiveness of snapshot management.

The illustrated events include creating of new snapshots and operations related to writing to the cache memory and to the physical address space (destaging).

Figure 6A:
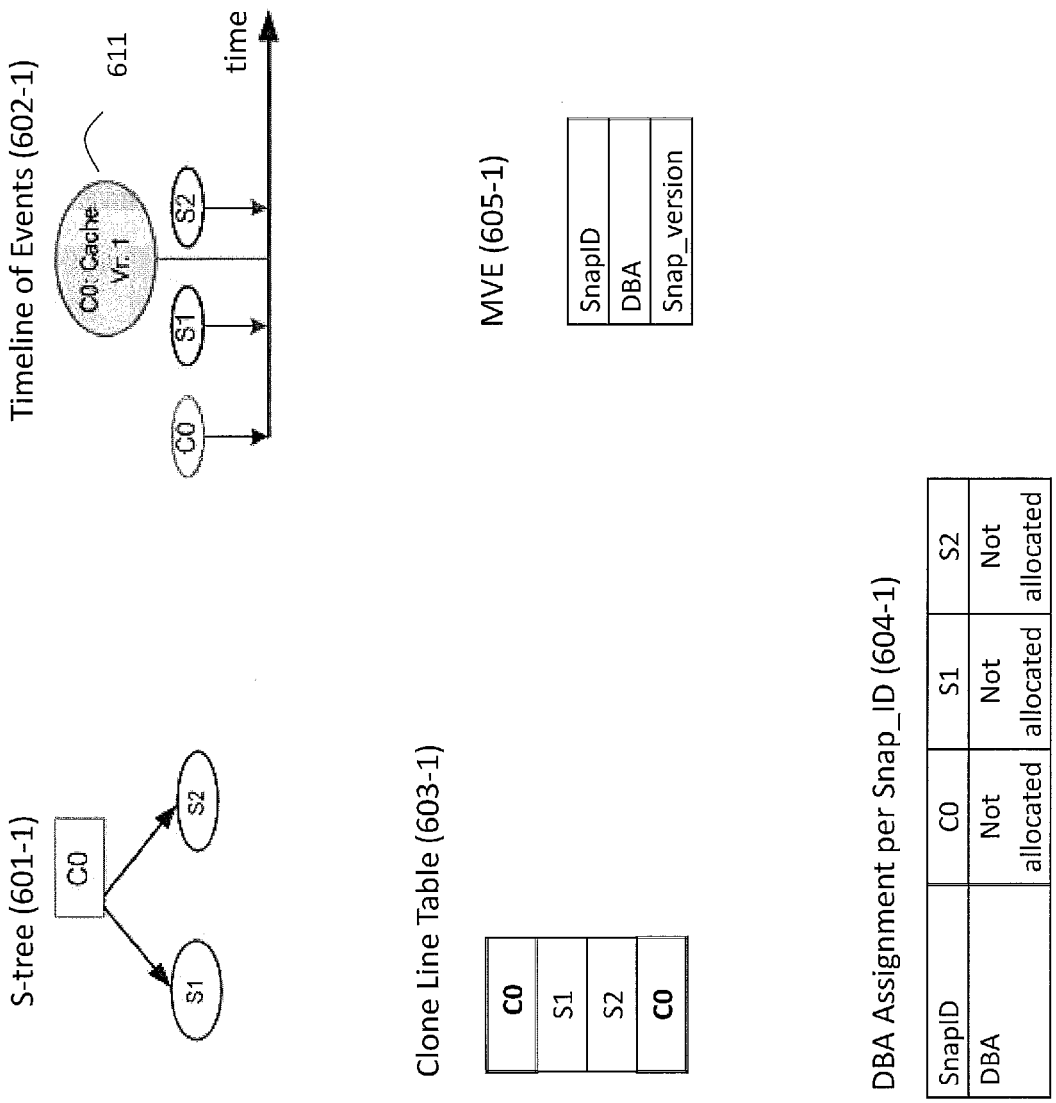

In accordance the timeline 602-1 illustrated in FIG. 6a, after creating the read-only snapshot S1 of the master volume C0, the control layer receives a write request addressed to the master volume. The write request specifies the addressed family member (C0 in the illustrated example). The control layer enables writing data (event 611) to the cache memory.

In the non-limiting example illustrated in FIG. 6a, the data written to the cache memory is associated with the indication of Snap_version=1 (denoted as Vr.=1) as, at the moment of writing, the latest created snapshot (i.e. snapshot S1) had Snap_ID=1. Snapshot S2 is created after writing the data 611 to the cache memory. The illustrated in FIG. 6a stage does not comprise destaging data from the cache memory to the physical storage space. Accordingly, no DBA allocation has been provided, and the mapping table 604-1 and MVE data structure 605-1 are empty. The S-tree 601-1 and the clone line table 603-1 represent the snapshot family at the end of the illustrated stage.

Figure 6B:
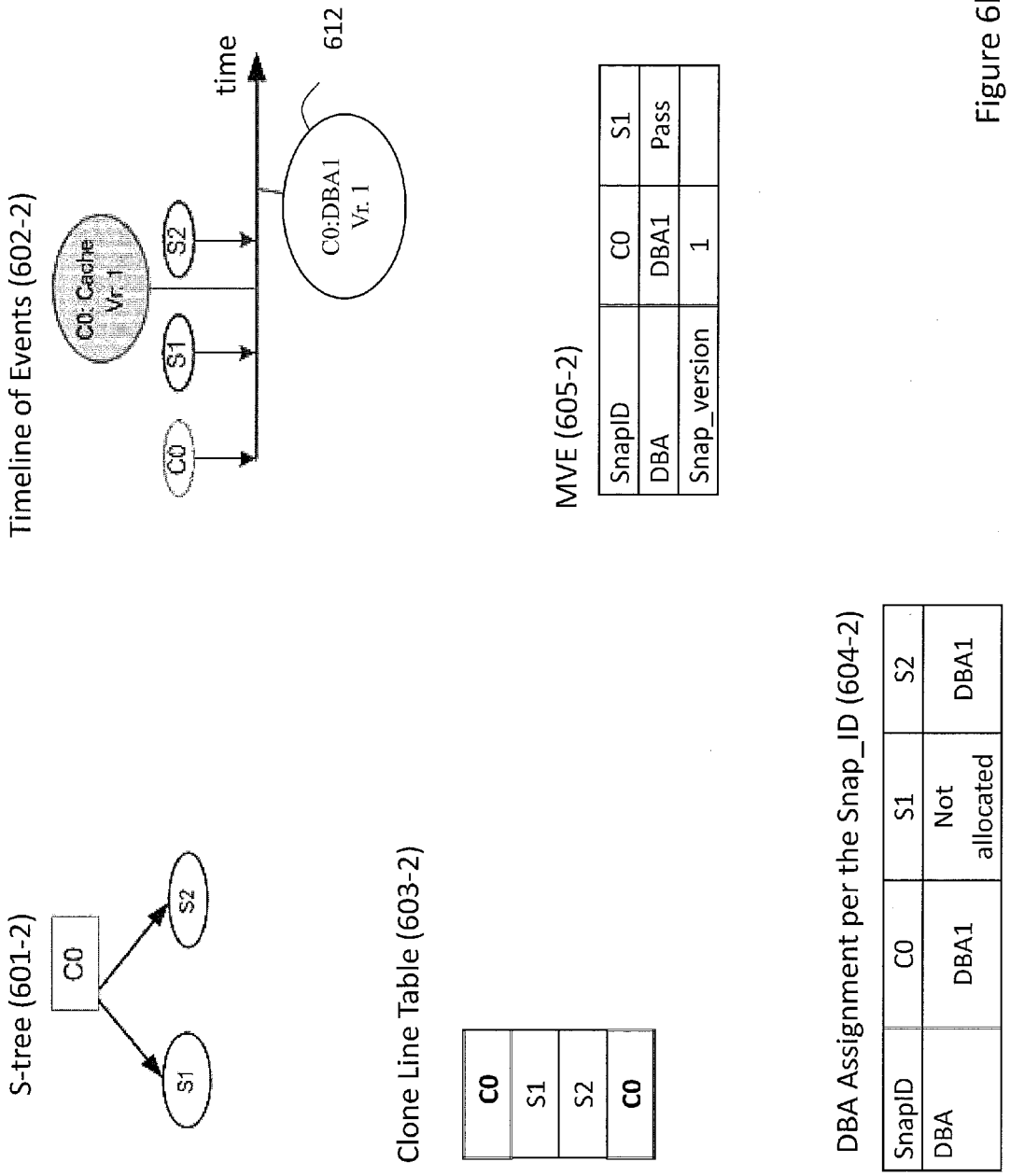

Referring to FIG. 6b, as illustrated in the timeline 602-2, data 611 cached in the cache memory has been destaged to the physical address range DBA1 (event 612: destage (C0: DBA1, vr.1)) (destage events in the timelines are presented under the time axis). No changes have been provided in S-tree 601-2 and in clone line table 603-2. As illustrated in the mapping table 604-2, since C0 has been modified after creation of S1 and before S2 creation, there is no DBA assigned to S1, while S2 shares the same DBA1 range as the master volume C0. Accordingly, snapshot entry of the MVE data structure 605-1 does not comprise Snap_ID=2. C0 represents DBA1 for both the master volume as well as the omitted member S2. Since no data has been written to S1, the value corresponding to Snap_ID=1 is specified in the physical storage entry as "pass".

At the stage illustrated in FIG. 6c, after creating the snapshot S2, the control layer has received a new write request addressed to the master volume C0, and new data associated with Snap_version=2 has been written (not illustrated) to the cache memory and has been destaged to the physical address range DBA2 (event 613, destage (C0: DBA2, vr.2)). No changes have been provided in S-tree 601-3 and in clone line table 603-3. As illustrated in the mapping table 904-3, DBA assigned to C0 is changed to DBA2, while DBA assigned to S2 continues to be in DBA1. Since C0 and S2 no longer share the same DBA, C0 cannot represent the DBA for S2 and S2 has to be included in the MVE. Thus snapshot entry in MVE data structure 605-3 comprises value Snap_ID=2 with corresponding value DBA1 in the physical storage entry.

Figure 6D:
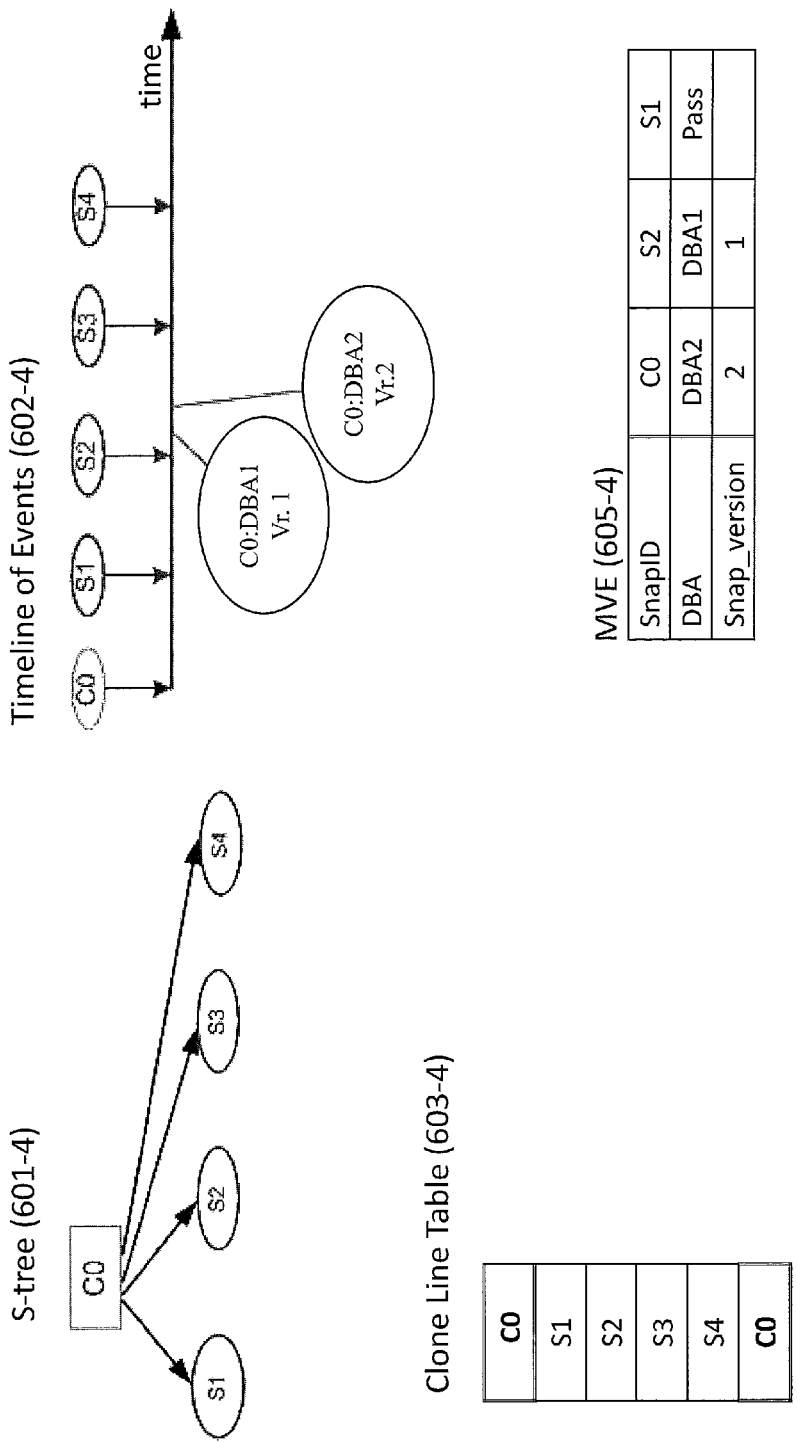

Referring to FIG. 6d, as illustrated in the timeline 602-4, new snapshots S3 and S4 have been created. S-tree 601-4 and clone line table 602-4 have been updated accordingly to present the newly created snapshots as direct children of the master volume C0. As illustrated in the mapping table 604-4, the new snapshots correspond to the same DBA2 range as the master volume C0. Accordingly, snapshot entry of the MVE data structure 605-2 does not comprise entries for Snap_ID=3 and Snap_ID=4, and respective snapshots can be looked up in accordance with the clone line. Thus, the MVE data structure is not modified, the newly created SF members are omitted in MVE and yet DBA2 range is represented in the MVE by the master volume C0.

Figure 6E:
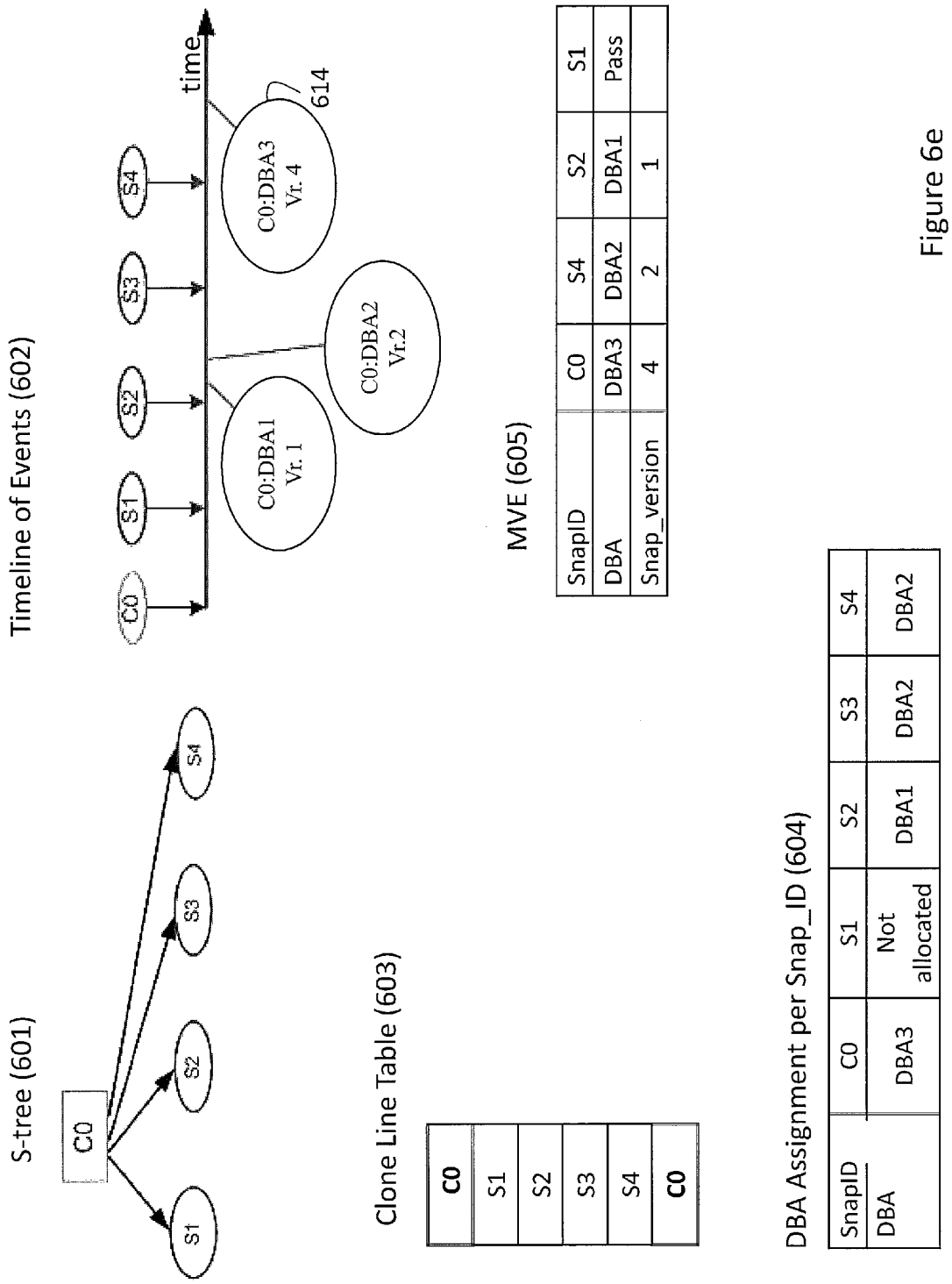

Referring to FIG. 6e, as illustrated in the timeline 602-5, after creating the snapshot S4, the control layer has received a new write request addressed to the master volume C0, new data associated with Snap_version=4 has been written (not illustrated) to the cache memory and has been destaged to the physical address range DBA3 (event 614, destage (C0: DBA3, vr.4)). No changes have been provided in S-tree 601-5 and in clone line table 603-5. As illustrated in the mapping table 604-5, DBA assigned to C0 is changed to DBA3, while S3 and S4 continue to share DBA2. Since C0 no longer shares DBA range with the snapshots S3 and S4, the snapshot entry in MVE data structure 605-5 comprises value Snap_ID=4 (among S3 and S4, the snapshot S4 is the latest in the clone line) with corresponding value DBA2 in the physical storage entry.

It is noted that snapshots with Snap_ID smaller or equal to Snap_version of a destage data are not affected by such destaging.

Figure 6F:
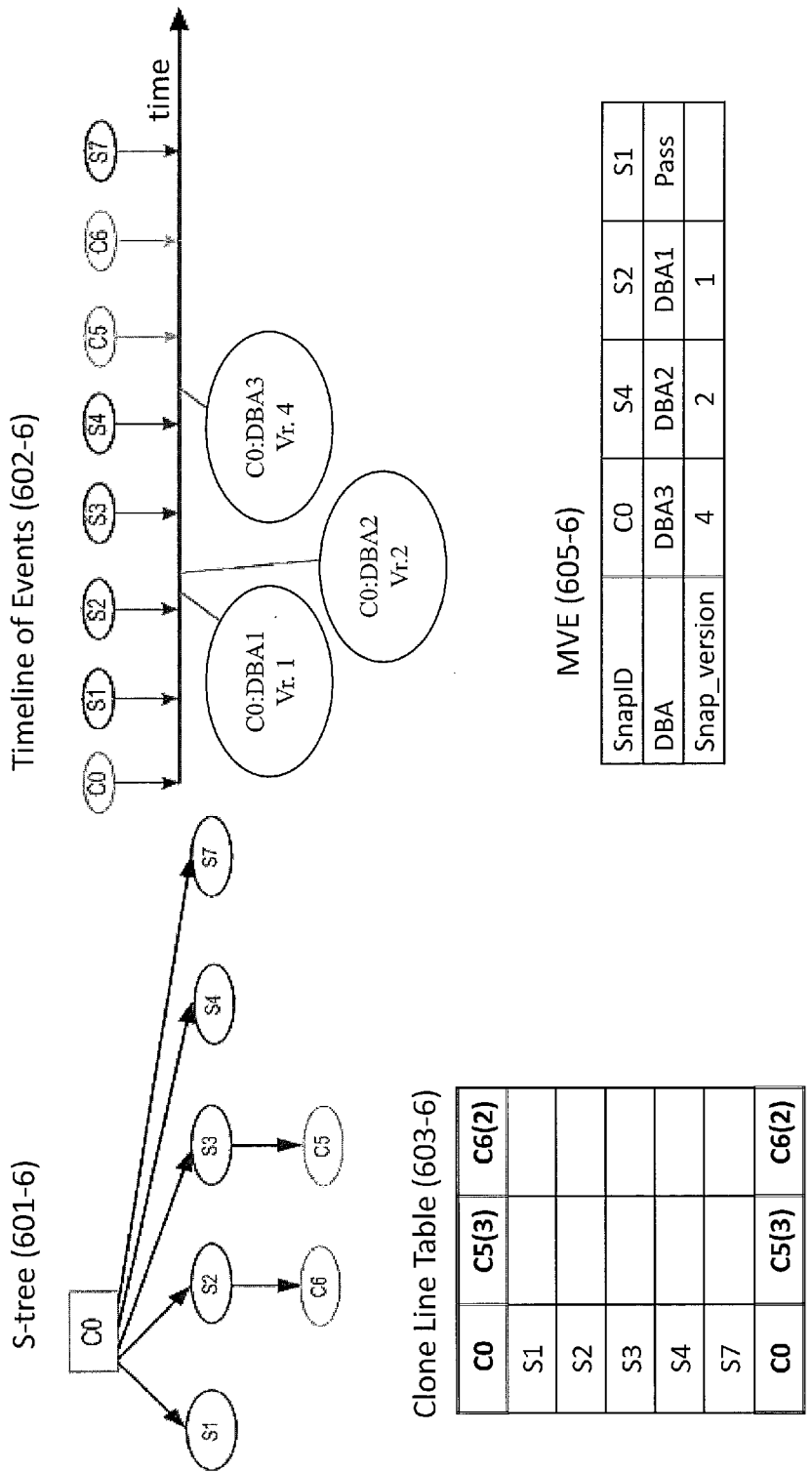

Referring to FIG. 6f, as illustrated in the timeline 602-6, new clones C5 and C6 and the read-only snapshot S7 have been created. The S-tree 601-6 and the clone line table 603-7 have been updated accordingly to present the newly created clone C5 as direct child of S3, clone C6 as direct child of S2 and the snapshot S7 as direct child of the master volume C0. C5 shares DBA2 range with its parent S3 and with S4. The value DBA2 in the physical storage entry of the MVE should have uniqueness representation, i.e. to correspond to one and only one Snap_ID among the members sharing the same DBA range. As presented by way of non-limiting example in MVE data structure 605-6, this only one member is selected among the sharing members as the last member in the earliest clone line, i.e. S4. When the control layer looks up and does not find C5 in the MVE, it looks for its parent S3. When S3 is also not found, the control layer searches down the clone line comprising S3 (i.e. the clone line with C0 as a parent clone) and finds S4 sharing the same DBA2 range with C5 and presented in the MVE.

The new clone C6 shares DBA1 with its parent S2, which is already represented in the MVE 605-6, thus need not be added to the MVE. Likewise, the new snapshot S7 shares DBA3 with its parent C0, which is already represented in the MVE 605-6, thus need not be added to the MVE data structure.

Figure 6G:
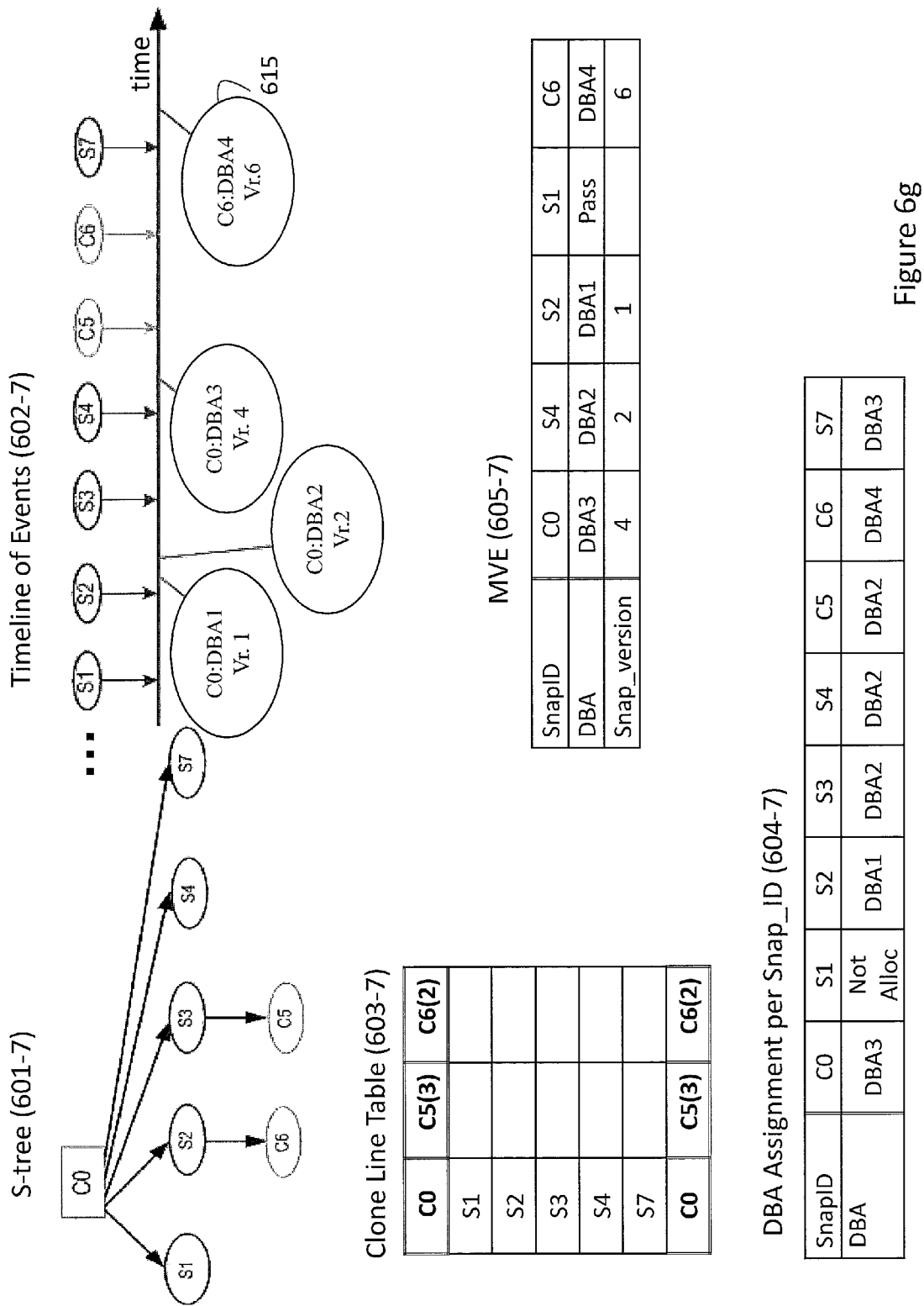

Referring to FIG. 6g, as illustrated in the timeline 602-7, after creating the clone C6 and before creating the snapshot S7, the control layer has received a new write request addressed to the clone C6, new data has been written (not illustrated) to the cache memory (bearing indication of Snap_version=6) and has been destaged to the physical address range DBA4 (event 615, destage (C6: DBA4, vr.6)) after creating the snapshot S7. No changes have been provided in S-tree 601-7 and in clone line table 603-7. As illustrated in the mapping table 604-7, DBA assigned to C6 is changed to DBA4. Accordingly, upon destaging, the snapshot entry in MVE data structure 605-7 is updated to include value Snap_ID=6 with corresponding value DBA4 in the physical storage entry.

Figure 6H:
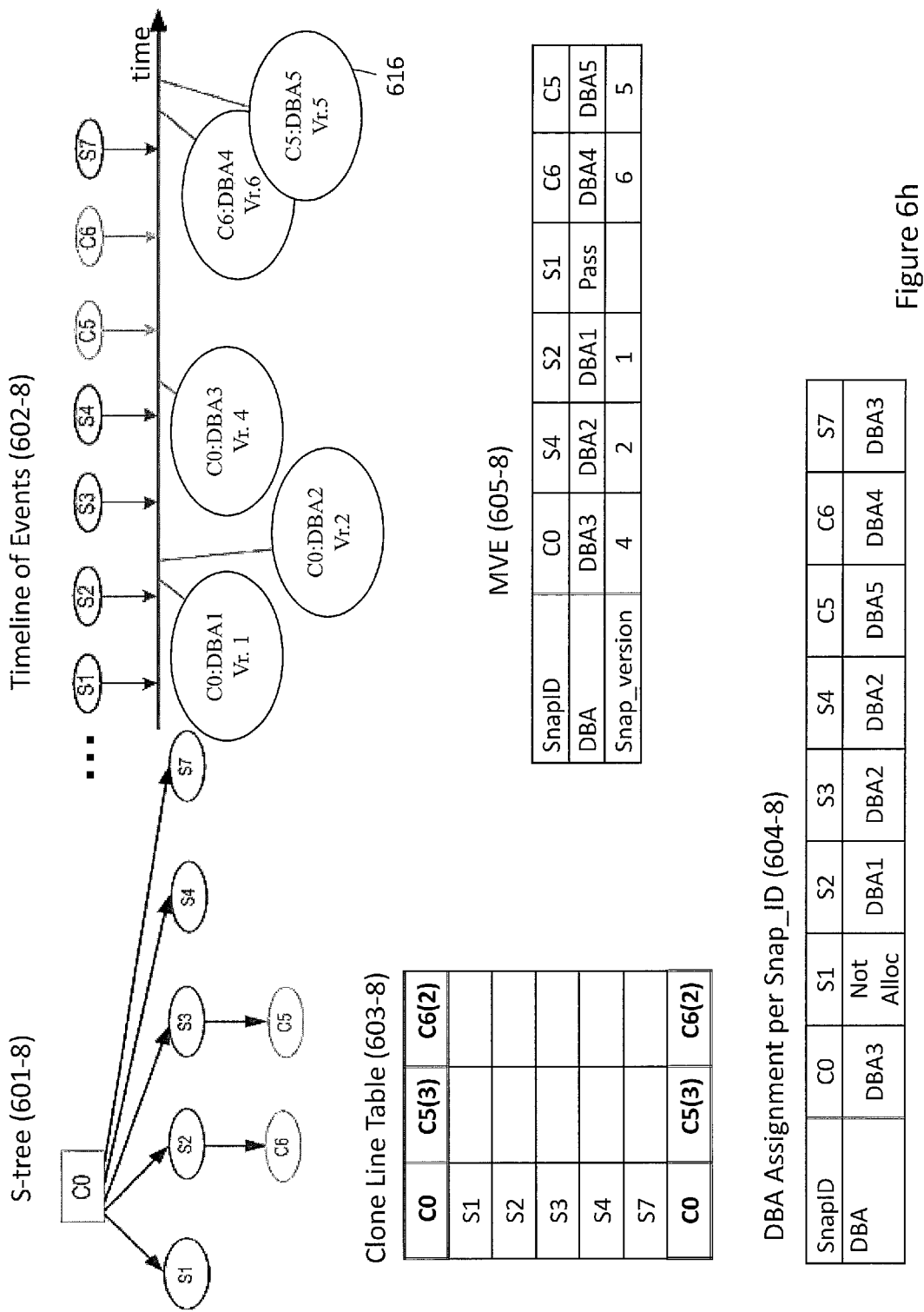

Likewise, as illustrated in FIG. 6h, after creating the clone C5 and before creating the clone C6, the control layer has received a new write request addressed to the clone C5, new data has been written (not illustrated) to the cache memory (bearing indication of Snap_version=5) and has been destaged to the physical address range DBA5 (event 616, destage (C5: DBA5, vr.5)) after creating the snapshot S7. No changes have been provided in S-tree 601-8 and in clone line table 603-8. As illustrated in the mapping table 604-8, DBA assigned to C5 is changed to DBA5. Accordingly, upon destaging, the snapshot entry in MVE data structure 605-8 is updated to include value Snap_ID=5 with corresponding value DBA5 in the physical storage entry.

Figure 6I:
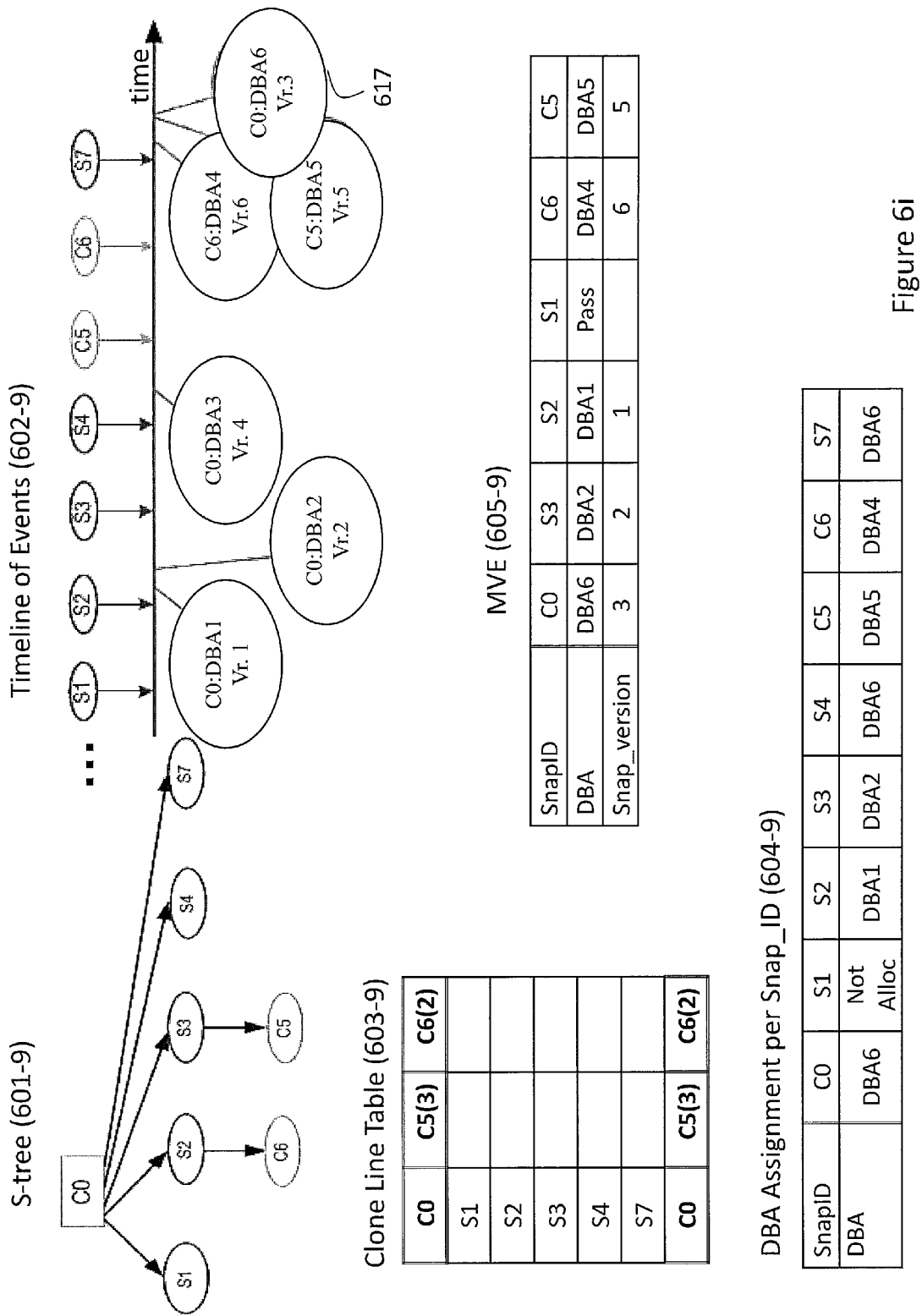

Referring to FIG. 6i, as illustrated in the timeline 602-9, upon creating the snapshot S3 and before creating the snapshot S4, the control layer has received a new write request addressed to the master volume C0, new data has been written (not illustrated) to the cache memory (bearing indication of Snap_version=3) and has been destaged to the physical address range DBA6 (event 617, destage (C0: DBA6, yr. 3)) after creating the snapshot S7. No changes have been provided in S-tree 601-9 and in clone line table 603-9.

As several snapshots have been created between writing data to the cache and destaging therefrom, the control layer needs to update the MVE 605-9 accordingly. The received write request can affect the members created after S3 and not modified before the destaging event 617, i.e. the snapshots S4 and S7. Accordingly, as illustrated in the mapping table 604-9, upon destaging, S4 and S7 share DBA6 with the master volume C0. Before the destage event 617, the snapshot S4 shared DBA2 with S3, and DBA2 was presented in the MVE 605-8 by Snap_ID=4. Since, upon the destage event 617, the snapshots S4 and S7 share DBA6 with the master volume (the latest element in the respective clone line), the snapshot entry in MVE data structure 605-9 is updated to exclude S4 and to include S3 as corresponding to the range DBA2.

As illustrated, the DBA range corresponding to S4 has been changed with no changes of S4. If an access request addressed to the snapshot S4 arrives before the destage event 617, the request will be served using DBA2 address range.

Figure 6J:
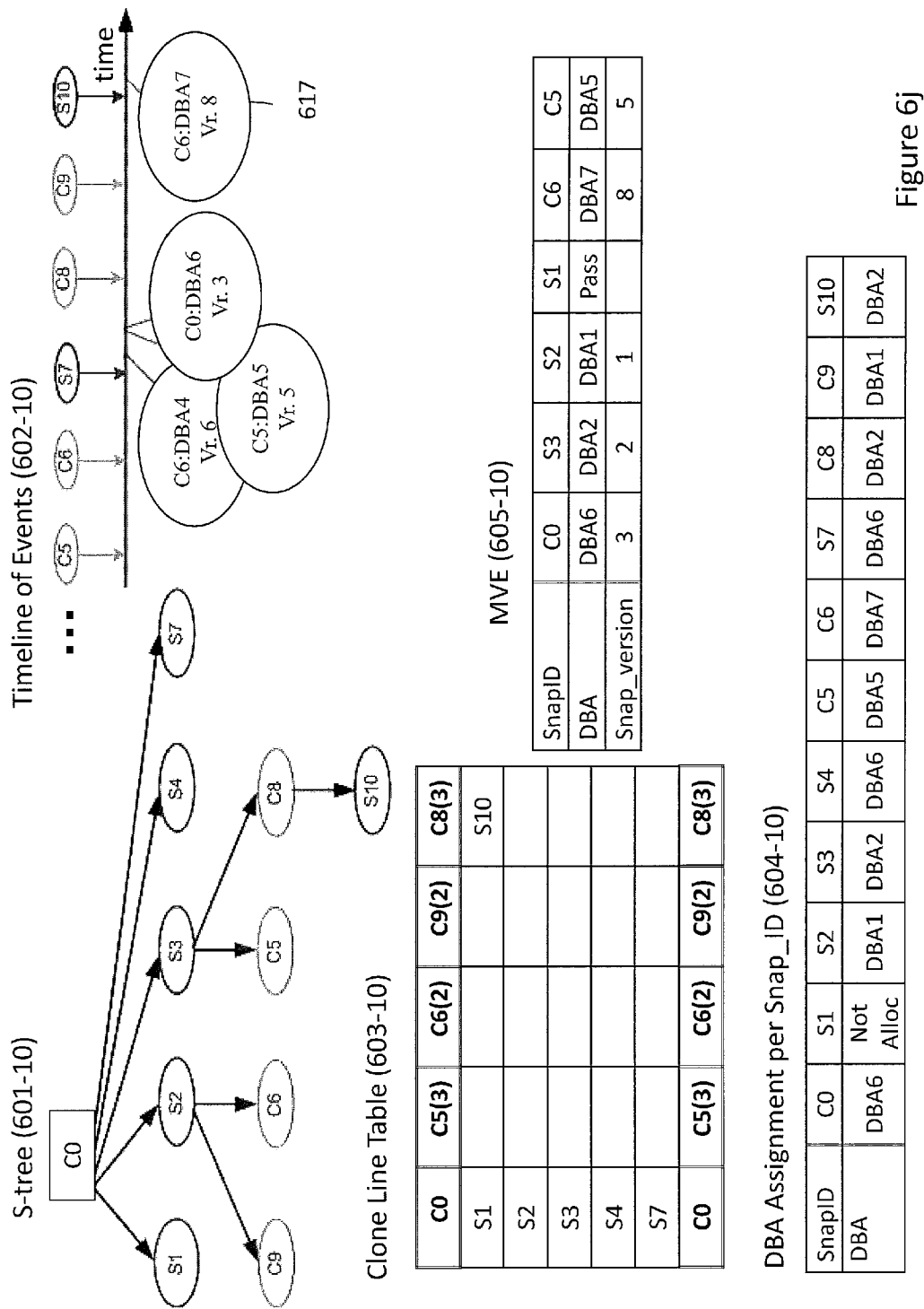

Referring to FIG. 6j, as illustrated in the timeline 602-10, new clones C8 and C9 and the read-only snapshot S10 have been created. The S-tree 601-10 and the clone line table 603-10 have been updated accordingly to present the newly created clone C8 as direct child of S3, clone C9 as direct child of S2 and the snapshot S10 as direct child of the clone C8. As presented in the mapping table, C8 shares DBA2 range with its parent S3 and with its child S10; C9 shares DBA1 range with S2. Upon creating the clone C8 and before creating the clone C9, the control layer has received a new write request addressed to the clone C6, new data has been written (not illustrated) to the cache memory (bearing indication of Snap_version=8) and has been destaged to the physical address range DBA7 (event 618, destage (C6: DBA7, vr. 8)) after creating the snapshot S10. Accordingly, the physical storage entry of the MVE 605-10 is updated so that the value Snap_ID=5 in the snapshot entry corresponds to the value DBA7. Since there is no member corresponding to the range DBA4, this range can be discarded and deleted from the MVE.

Snapshots can be useful in many processes requiring comparing data stored in the storage systems at different points-in-time. For purpose of illustration only, the following description is provided for detecting and using changes in the stored data during asynchronous remote mirroring. It is noted that the disclosed technique of defining changes in data stored at different points-in-time is applicable in a similar manner to other scenarios as, for example, users behaviour monitoring, anomaly detection (e.g. virus detection), live data migration, incremental backup, etc.

It is common to "mirror" or replicate some or all volumes of stored data from a primary storage system (referred to hereinafter also as LS system) to a remote storage system (referred to hereinafter also as RS system). The hosts interact directly with the PS system, while any data changes made to the PS systems are automatically provided to the one or more RS systems. The primary and remote storage systems are connected by a data link (e.g. ESCON link, a Fibre Channel link, Gigabit Ethernet link, etc.).

An RS system can be updated synchronously to writing data from a host to a PS system. In synchronous mode the host does not receive a write acknowledge from the PS system device until data transfer to the RS system has been completed and acknowledgement from the RS system is received.

Among drawbacks of the synchronous mode is that write operations require waiting for the acknowledgement from the RS system. The latency can be reduced by mirroring in an asynchronous mode, when the host asynchronously writes data to the PS system, and the PS system updates the RS system at regular intervals, typically set by an administrator.

The complete recopying of the entire stored data to the RS system over a network may be quite inconvenient for large data volumes. Such a full-backup approach may severely burden the bandwidth of the network and also the processing capabilities of both LS and RS systems. Thus, it would be desirable to transmit to the RS system only changes in data stored in LS system between transferring events, thereby providing an incremental asynchronous mirroring.

Typically in prior art, data that needs to be transmitted to the RS system as part of an asynchronous mirroring cycle are marked with a flag and left in cache until receiving, by the LS system, acknowledgement of successful updating the RS system. However, in some circumstances (e.g. a slow-down in communication causing excessive growth of waiting data, cache memory overflow, etc.) all or part of the cached data that is waiting for transmission needs to be destaged and deleted from the cache memory. Furthermore, some data may be required to be destaged by clients.

In accordance with certain embodiments of the presently disclosed subject matter, there is provided a technique enabling incremental asynchronous mirroring with no need of special handling (e.g. copying and/or destaging to a dedicated location) data that needs to be transmitted to the RS system.

Figure 7:
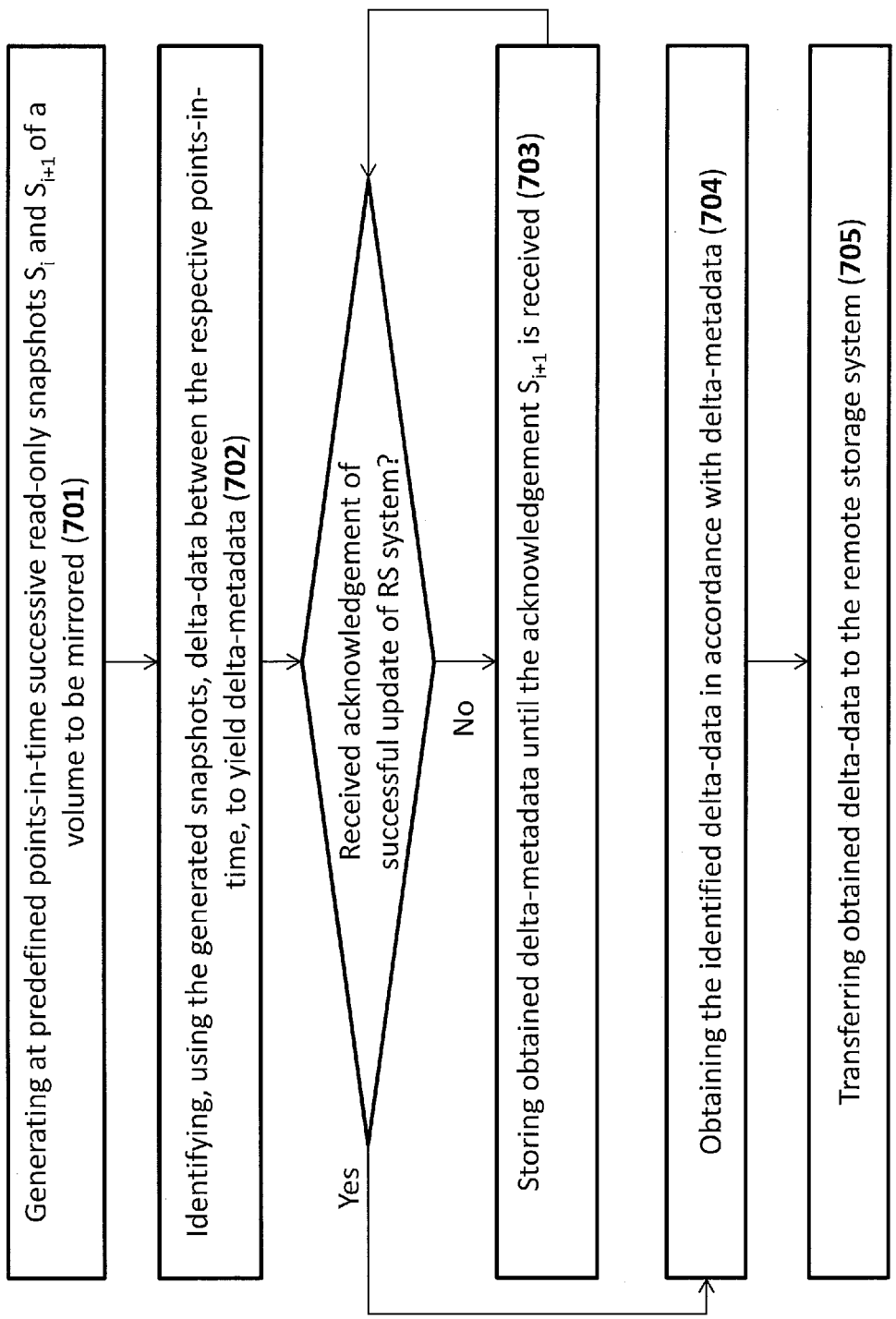
FIG. 7 illustrates a generalized flow chart of incremental asynchronous mirroring in accordance with certain embodiments of the presently disclosed subject matter.

Referring to FIG. 7, there is illustrated a generalized flow chart of incremental asynchronous mirroring in accordance with certain embodiments of the presently disclosed subject matter. The control layer (e.g. snapshot management module) generates (701) at predefined points-in-time successive read-only snapshots $S_i$ and $S_{i+1}$ of a volume to be mirrored, and identifies (702), using the generated snapshots, delta-data between the respective points-in-time and, thereby, generates delta-metadata indicative of the identified delta-data.

The term "delta-data between points-in-time" should be expansively construed to cover any data written to a storage system between two respective points-in-time and stored in a cache memory or/and storage devices configured for permanent data storage.

Responsive to receiving from the RS system acknowledgement of successful update, the control layer obtains (704) the identified delta-data using the generated delta-metadata; and transfers (705) the delta-data to the remote storage system. Received acknowledgement $S_i$ is indicative of consistency between the volume and the mirror thereof at the point-in-time corresponding to snapshot $S_i$.

If no acknowledgement $S_{i+1}$ is received until generation of snapshot $S_{i+2}$, the control layer stores (703) delta-metadata until the acknowledgement $S_{i+1}$ is received. Alternatively, the control layer can be configured to identify delta-data between the respective points-in-time and to generate respective delta-metadata responsive to receiving acknowledgement $S_{i+1}$.

Likewise, if several snapshots subsequent to $S_{i+1}$ have been generated before receiving acknowledgement $S_{i+1}$, for each pair of successive snapshots with Snap_ID>i and generated before receiving acknowledgement $S_{i+1}$, the storage layer identifies respective delta-data and stores respective metadata. Upon receiving acknowledgement $S_{i+1}$, the control layer obtains and sends respective delta-data for each pair of generated snapshots. Optionally, all stored delta-metadata and respective delta-data can be combined before transferring to the RS system. In this case, the acknowledgement to be received corresponds to the last snapshot generated before receiving acknowledgement $S_{i+1}$.

Typically, although not necessarily, these generated read-only snapshots are dedicated for remote mirroring purposes and are unavailable for the hosts. The dedicated snapshots can be generated with high frequency (e.g. every millisecond or, even, microsecond) and can be deleted after receiving acknowledgement of a respective successful update of RS system.

Figure 8:
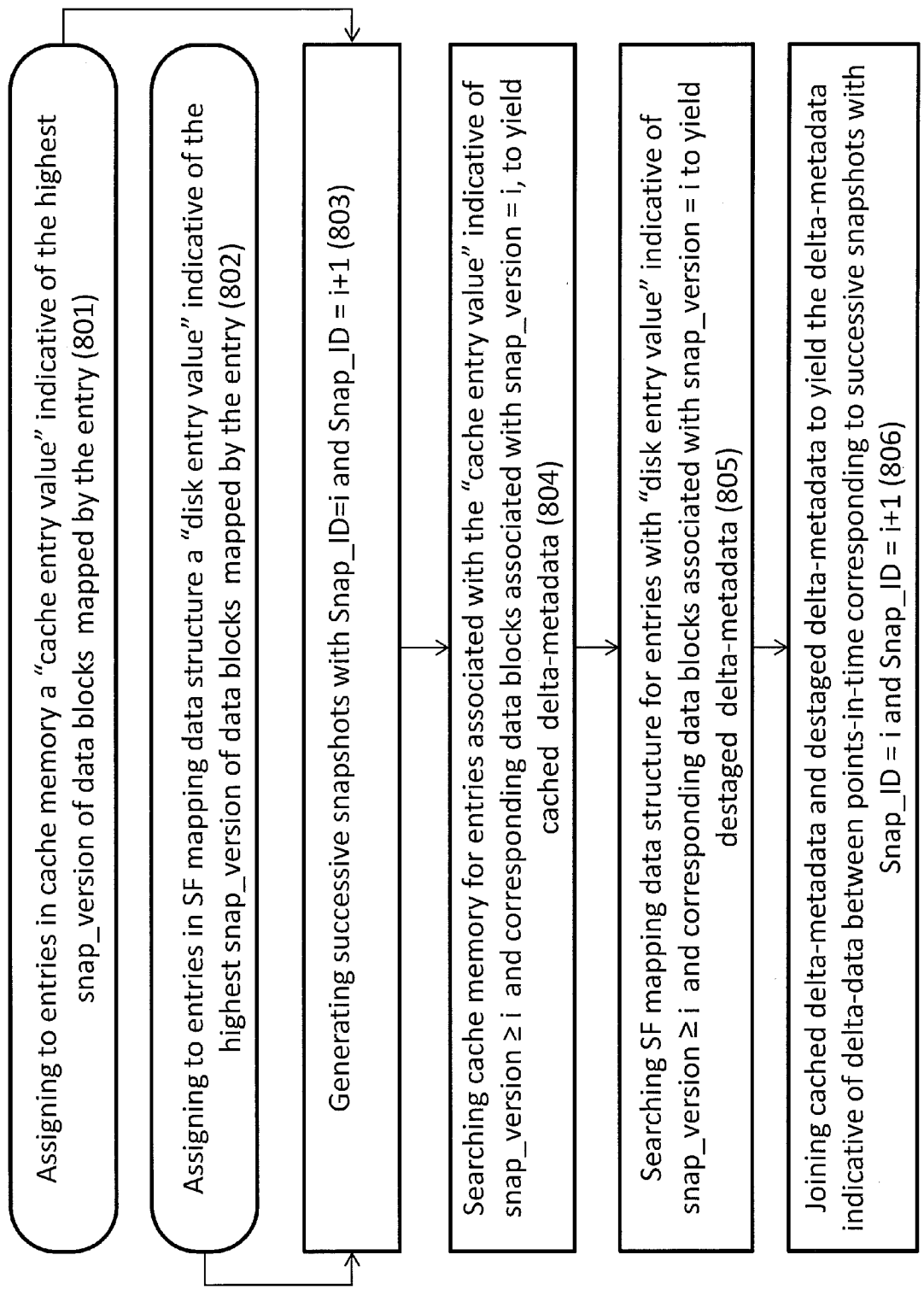
FIG. 8 illustrates a generalized flow chart of generating, in accordance with certain embodiments of the presently disclosed subject matter, delta-metadata indicative of meta-data between points-in-time corresponding to two successive snapshots.

Referring to FIG. 8, there is illustrated a generalized flow chart of identifying, in accordance with certain embodiments of the presently disclosed subject matter, delta-data between points-in-time corresponding to two successive snapshots.

As was detailed above, in accordance with certain embodiments of the presently disclosed subject matter, the control layer is configured to associate data to be cached with an indication of the addressed snapshot family, snapshot family member and with Snap_version identifier (referred to hereinafter also as snap_version of respective data block) indicative of the latest snapshot existing at the time of writing a given data portion to a cache memory.

Figure 9B:
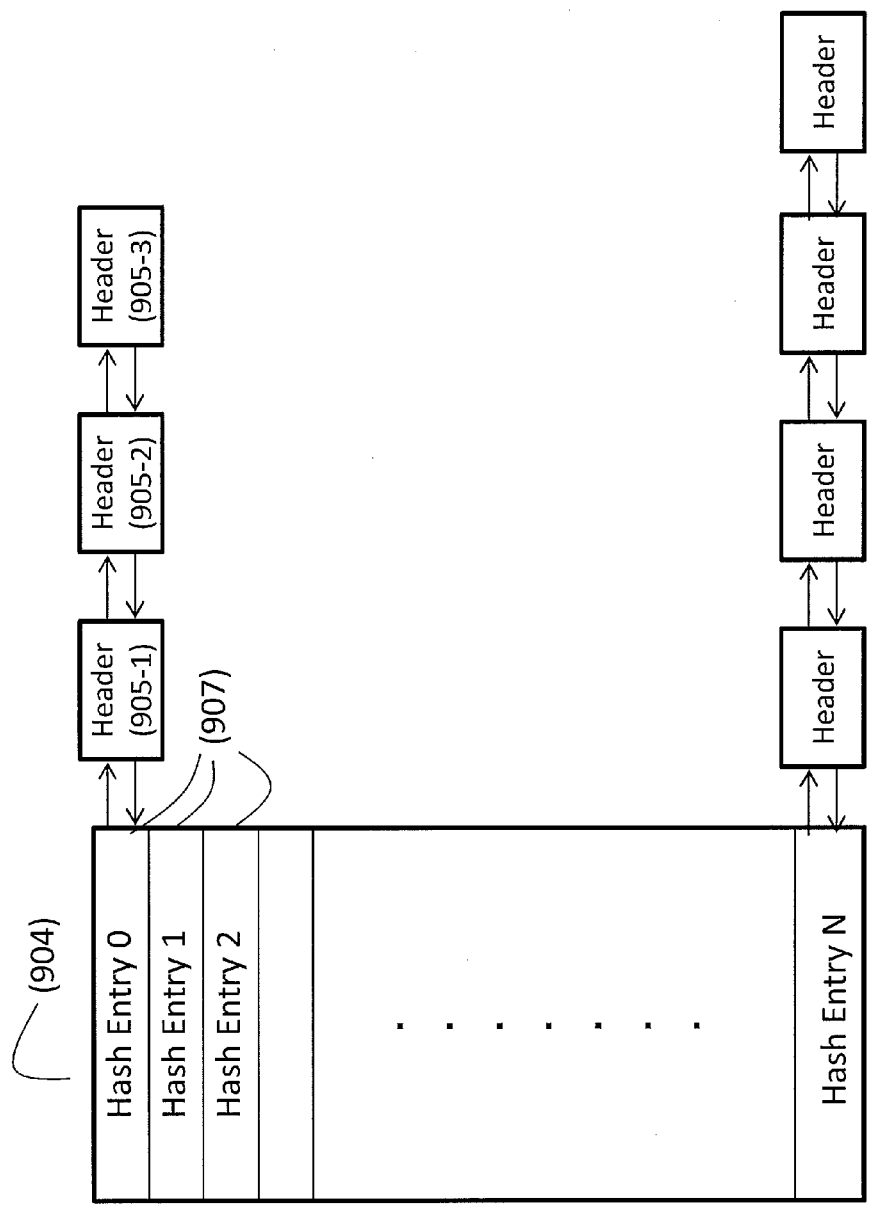

FIGS. 9a and 9b illustrate a cache memory in accordance with certain embodiments of the presently disclosed subject matter. Cache memory 900 comprises at least two distinct sections, a cache data section 901 and a cache directory section 902. The cache data section 901 can be further organized into a number of cache lines 903, which contain data blocks transferred from or to be transferred into storage devices. The cache lines can have equal length.

Cache directory section 902 is used to manage the cache and includes hash table 904 and headers 905. The cache directory section comprises data indicative of LBA and volume corresponding to data blocks in the cache lines as well as the status of these data blocks. Hash table 904, in conjunction with headers 905, is used to determine whether a particular data block is contained within the cache at a given time.

The hash table (bucket table) 904, is an array of hash entries 907 with each entry associated with a separate chain of linked headers. Each entry in the hash table points to a corresponding first header 905-1 in a doubly-linked chain of headers illustrated as 905-2 and 905-3. Each of the headers has a one-to-one association with a particular cache line contained within the cache. Hash functions usable for the hash table 904 shall output only a single index.

Each header in the linked chain can comprise a forward pointer, which points to a next header in the chain and a backward pointer which points to a previous header in the list (or the hash table if the header is the first in the chain). Each header can further comprise a Volume Identifier indicative of a logical volume corresponding to respective data blocks, an Address Identifier indicative of a block number of the first block in the cache line, and Index Identifier indicative of an index into the heap for the cache line and Data Pointer indicative of address in the cache where the particular data block in the cache line is located. The header can further comprise a Valid Bitmap, having, for each data block, one bit indicative of whether a particular data block is contained within a cache line. The header can further comprise a Dirty Bitmap, having, for each data block, one bit indicative of whether a particular data block in the cache line is "dirty".

In the presence of snapshots it is possible that the cache memory comprises data blocks corresponding to the same LBA, but associated with different members of the snapshot family.

In accordance with certain embodiments of the presently disclosed subject matter, the cache directory section comprises data indicative of Family_ID, Snap_ID and LBA corresponding to data blocks in the cache data section as well as Snap_version identifier and status of these data blocks. The cache directory is configured in a manner that entries 907 in the hash table are characterised by Family_ID and LBA, and the headers comprise (Family_ID, Snap_ID, LBA) and Snap_version identifiers associated with respective data blocks. All headers comprising the same Family_ID and LBA are chained together and associated with a hash entry corresponding to the LBA within SF logical address space. Thus, all dirty data blocks with the same LBA and associated with SF family members with different Snap_ID and/or Snap_version are associated with a cache directory entry corresponding to this LBA.

The hash entries can be configured to correspond to the entries in the SF mapping data structure (e.g. to the entries 401-1-401-$k$), each hash entry corresponding to variable-length range of contiguous logical addresses within the logical address space of a respective snapshot family.

It is noted that the teachings of the presently disclosed subject matter are not bound by the cache memory structure illustrated in FIGS. 9*a* and 9*b* and are applicable in a similar manner to any cache memory structure configured in a manner that all dirty data blocks with the same LBA and associated with SF family members with different Snap_ID and/or Snap_version are associated with a cache directory entry corresponding to the LBA.

Referring back to FIG. 8, the control layer assigns (801) (e.g. using the cache management module 107) to each cache mapping entry (e.g. hash entry) in the cache memory a constantly updated "cache entry value" indicative of the highest value of snap_version identifier out of snap_version identifiers associated with data blocks mapped by the respective entry. It is noted that "cache entry value" corresponds to the highest snap_version of data blocks associated with a given LBA within a snapshot family address space since all such data blocks are associated with the same hash entry.

As was detailed above, in accordance with certain embodiments of the currently presented subject matter, MVE data structure comprises snap_version entry configured to associate a given DBA with snap_version identifier indicative of the latest snapshot existing at the time of writing to the cache memory data portion corresponding, when destaged, to DBA. The control layer is further configured (e.g. using the snapshot management module 105) to assign (802) to entries 401-1-401-$k$ in SF mapping data structure a constantly updated "disk entry value" indicative of the highest value of snap_version identifier out of snap_version identifiers associated with destaged data blocks mapped by the respective SF mapping entry.

As was detailed with reference to FIG. 7, control layer generates (803) successive snapshots $S_i$ and $S_{i+1}$, these snapshots to be used for identifying delta-data between corresponding points-in-time. Upon generating the snapshot $S_{i+1}$, the control layer (e.g. cache management module 107) searches the cache memory for hash entries associated with the "cache entry value" indicative of snap_version≥i, and further searches the found entries (if any) for data blocks associated with snap_version=i, thereby yielding (804) cached delta-metadata.

The control layer (e.g. snapshot management module 105) further searches SF mapping data structure for entries with "disk entry value" indicative of snap_version≥i, and further searches MVEs in the found SF mapping entries for destaged data blocks associated with snap_version=i, thereby yielding (805) destaged delta-metadata.

The control layer further joins (806) cached delta-metadata and destaged delta-metadata, thereby yielding the delta-metadata indicative of the requested delta-data between points-in-time corresponding to the successive snapshots with Snap_ID=i and Snap_ID=i+1.

Typically, reading data from the cache is more effective than reading the same data from disks. Accordingly, in certain embodiments of the presently disclosed subject matter, the control layer, when joining cached delta-metadata and destaged delta-metadata, selects only cached delta-metadata if both delta-metadata and destaged delta-metadata are indicative of the same data block kept in the cache memory after destage.

It is noted that searching the SF mapping data structure for destaged data blocks can be provided over data blocks accessible for access requests received from one or more hosts. Thus, there is no need in copying, destaging to a dedicated location and/or any other special handling of data that needs to be transmitted to the RS system.

Figure 10A:
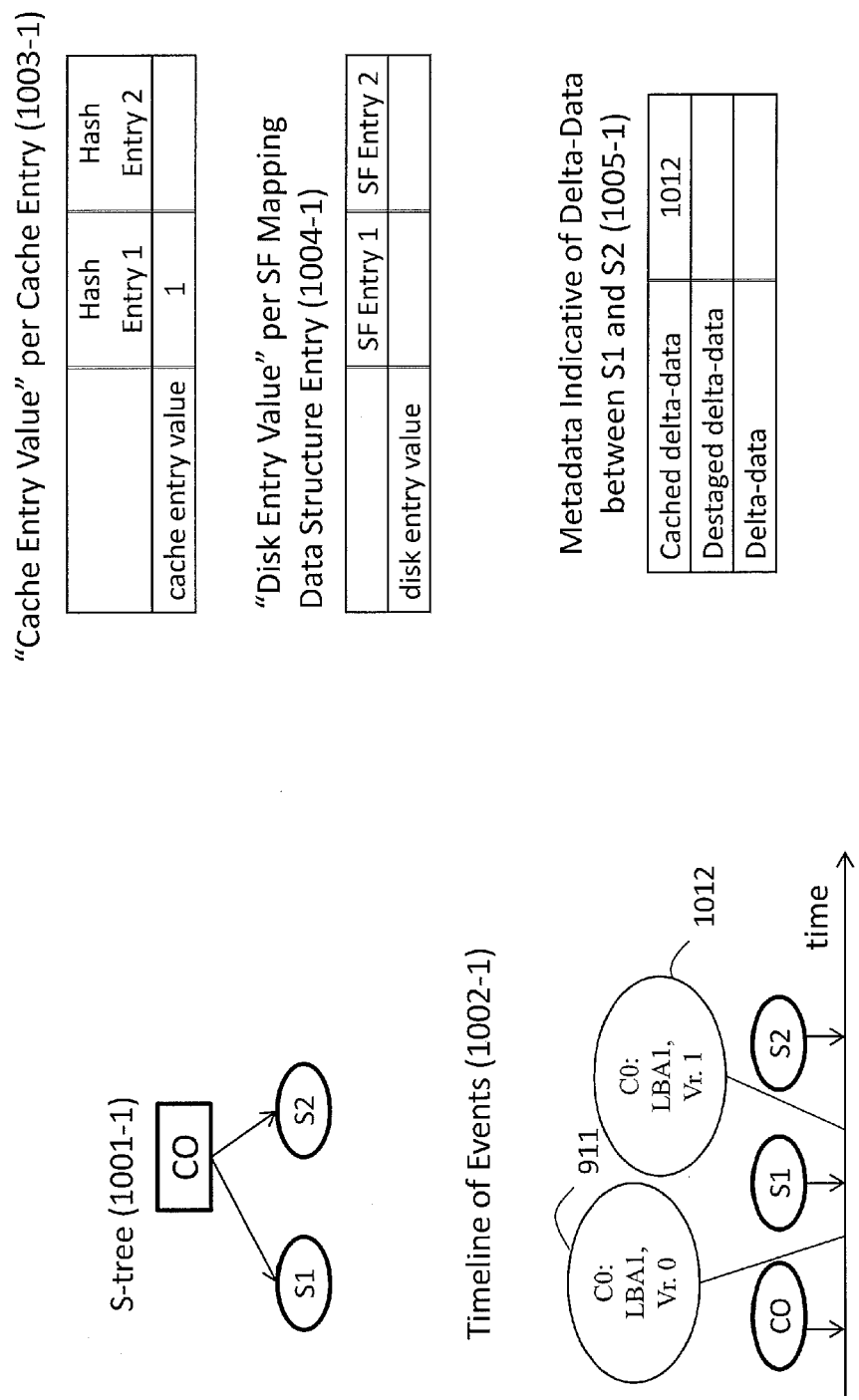
FIGS. 10a-10b illustrate non-limiting examples of delta-data in correspondence with exemplary timeline of events.
Figure 10B:
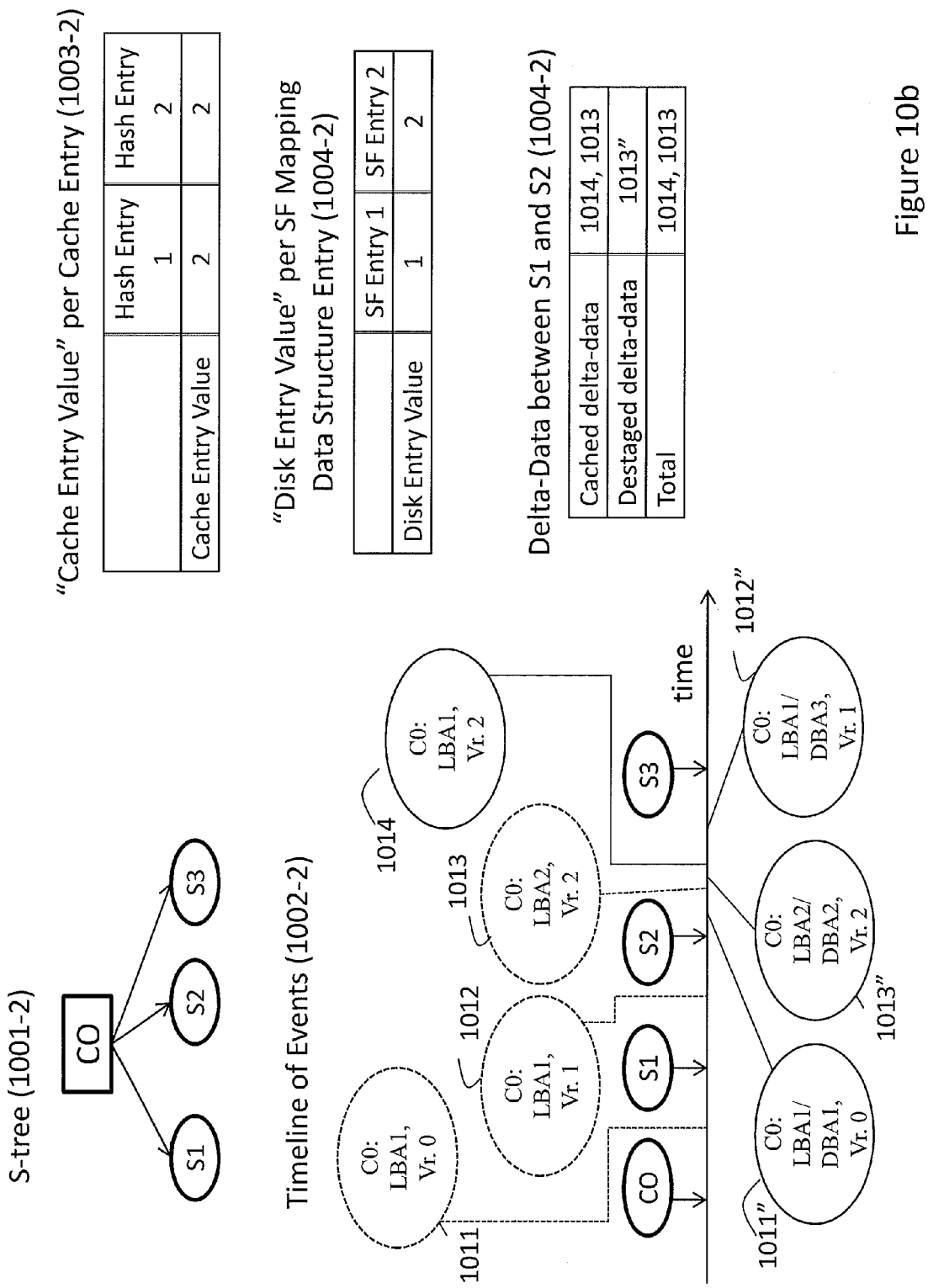

FIGS. 10*a*-10*b* illustrate non-limiting examples of identified delta-data in correspondence with exemplary timelines of events. In the non-limiting example illustrated in FIG. 10*a*, as presented by timeline 1002-1, at the moment of generating a read-only snapshot S2, the cache memory comprises data 1011 characterized by LBA range LBA1 and associated with Snap_version=0 as, at the moment of caching data 1011, there were no created snapshots. The cache memory further comprises data 1012 characterized by LBA range LBA1 and associated with Snap_version=1 as, at the moment of caching data 1012, the latest created snapshot was snapshot 51 (Snap_ID=1). Snapshot S2 is created after writing the data 1011 and 1012 to the cache memory, but before destaging these data to the disks, accordingly, no DBA allocation was provided before S2 was created. The S-tree 1001-1 represents the snapshot family at the end of the illustrated stage. For purpose of illustration, LBA ranges LBA1 and LBA2 correspond to different hash entries in the cache memory and to different mapping entries in SF mapping data structure. As illustrated in table 1003-1, "cache entry value" assigned to Hash Entry 1 is equal to one (the highest snap_version of data 1011 and 1012 associated with the entry), and no "cache entry value" is yet assigned to Hash Entry 2. As illustrated in table 1004-1, there is no "disk entry value" associated with SF entries at this stage. Table 1005-1 illustrates that delta-metadata indicative of delta-data between snapshots S1 and S2 is constituted by metadata indicative of data 1012.

Referring to FIG. 10*b*, as illustrated in the timeline 1002-2, after generating snapshot S2, data 1011 cached in the cache memory has been destaged (destaged data is denoted as 1011") to the physical address range DBA1. Destage events in the timeline are presented under the time axis, clean data portions comprised in the cache memory after destage are presented by dashed lines. After destaging data 1011, new data 1013 characterized by LBA range LBA2 and associated with Snap_version=2 has been written to the cache memory and has been destaged (destaged data is denoted as 1013") to the physical address range DBA2. After that, new data 1014 characterized by LBA range LBA1 and associated with Snap_version=2 has been written to the cache memory, and, later, data 1012 cached in the cache memory has been also destaged (destaged data is denoted as 1012") to the physical address range DBA3.

The S-tree 1001-2 represents the snapshot family at the end of the illustrated stage. As illustrated in table 1003-2, "cache entry value" associated with Hash Entry 1 is equal to two (the highest snap_version of data 1014 associated with the entry is snap_version of data 1014), and "cache entry value" associated with Hash Entry 2 is also equal to two (the highest snap_version of data associated with the entry is snap_version of data 1013). As illustrated in table 1004-2, the "disk entry value" associated with SF entry 1 is equal to 1 (the highest snap_version among data 1011" and 1012" mapped by the entry), and "disk entry value" associated with SF entry 2 is equal to 2 (the highest snap_version corresponding to data 1013" mapped by the entry). Table 1005-2 illustrates that delta-metadata indicative of delta-data between snapshots S2 and S3 is constituted by metadata indicative of data 1014 and data 1013. It is noted that cached delta-metadata indicative of data 1013 was selected when joining with corresponding to the same data block destaged delta-metadata indicative of data 1013".

It is noted that neither destaged data 1011" nor destaged data 1012" are included in the delta-data between snapshots S2 and S3 as they are associated with snap_versions less than corresponding to snapshot S2 and, accordingly, existed in the storage system before snapshot S2 generation.

It is also noted that, subject to that the respective data are not deleted (and/or discarded), the identified delta-data between $S_i$ and $S_{i+1}$ does not depend on a time T of identification occurring after $S_{i+1}$ point-in-time. Delta-data also does not depend on destaging data from the cache memory and/or order of destaging.

Searching cache entries or SF mapping entries associated with a certain value can be provided by different techniques, some of them known in the art. In accordance with certain embodiments of the presently disclosed subject matter, a process of locating SF mapping entries and destaged delta-data therein can be further optimized when the SF mapping data structure is configured as a mapping tree.

In accordance with certain embodiments of the presently disclosed subject matter, generating destaged delta-metadata using SF mapping data structure configured as a mapping tree comprises two independently operated processes: a process of handling the mapping tree and a process of traversing the mapping tree for identifying destaged delta-data.

Figure 11:
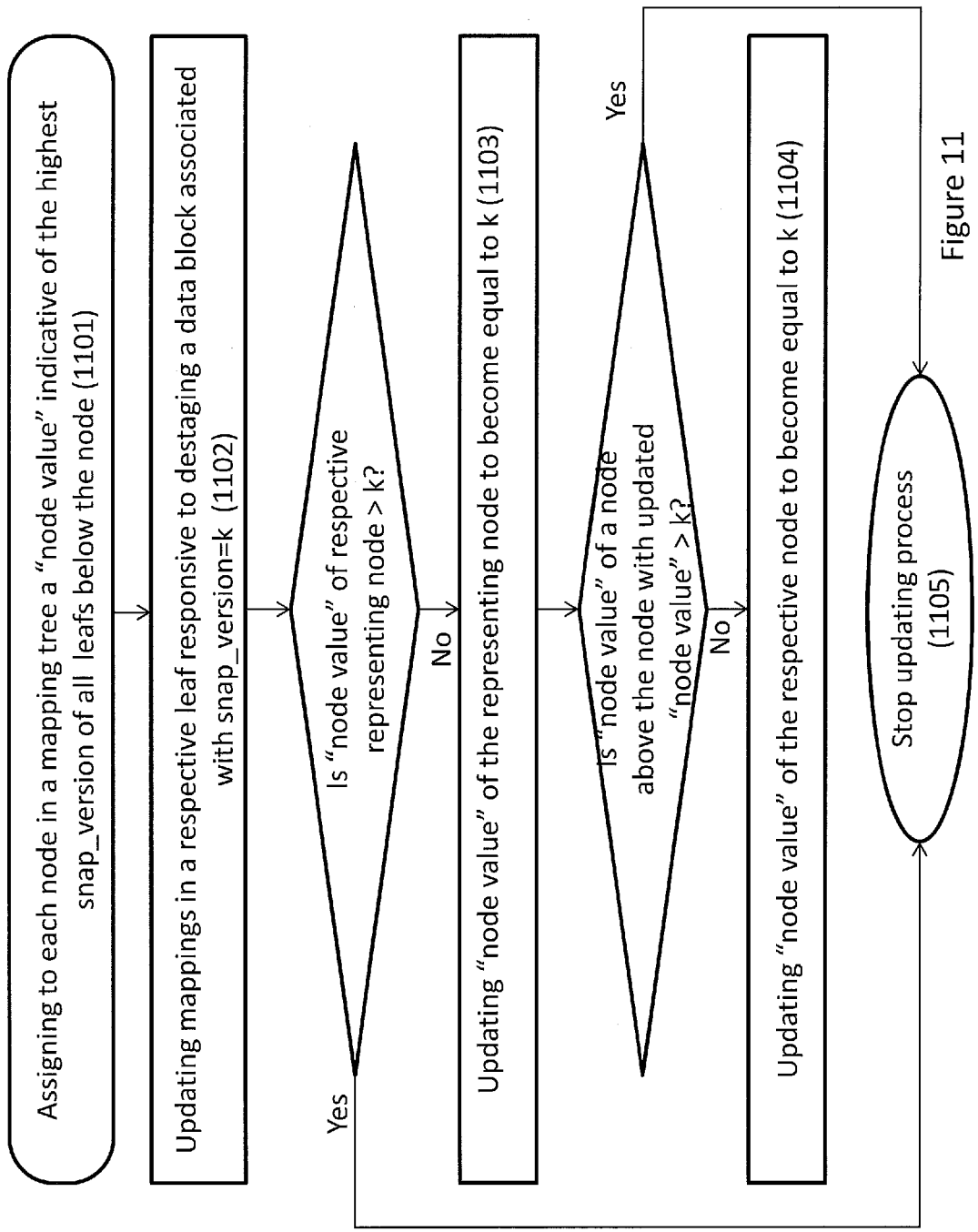
FIG. 11 illustrates a generalized flow-chart of handling a mapping tree in accordance with certain embodiments of the presently disclosed subject matter.

Referring to FIG. 11, there is illustrated a generalized flow-chart of handling a mapping tree in accordance with certain embodiments of the presently disclosed subject matter.

The mapping tree can be configured as an ordered tree data structure used to store an associative array, wherein a position of a node in the tree indicates certain values associated with the node. As presented by an exemplary mapping tree illustrated in FIGS. 12a-12b, there are three types of nodes in the mapping tree: a) having no associated values (illustrated by nodes 1213-1217); b) associated with a pointer to a further node (illustrated by nodes 1205-1212); or c) associated with numerical values, such nodes (illustrated by nodes 1201-1204) representing the leaves (illustrated as 1201-1-1204-1) of the tree, such nodes being referred to hereinafter as representing nodes.

For purpose of illustration only, the following description is provided in terms of a binary tree. Those skilled in the art will readily appreciate that the teachings of the presently disclosed subject matter are applicable in a similar manner to N-ary trie, where N is a number of elements in a RAID group. For example, for RAID6 application with 16 members per RAID group, the tree can be configured as 16-ary trie with a bottom layer comprising 14 branches corresponding to 14 data portions.

A non-limiting example of a mapping tree is disclosed in US Patent Application No. 2011/0082997 assigned to the Assignee of the present application and incorporated herewith by reference in its entirety. In SF mapping data structure, a leaf in the tree corresponds to SF mapping entry, a depth of a leaf in the tree can represent a length of contiguous range of logical addresses represented by the leaf, a path followed from a tree root to the leaf can indicate an offset of the range of addresses within the snapshot family logical address space; and MVE associated with the leaf can indicate corresponding DBA ranges assigned to different members of the snapshot family and snap_versions corresponding to respective data blocks.

Alternatively or additionally to "disk entry values", the control layer assigns (1101) to each given node in the mapping tree a "node value" indicative of the highest snap_version identifier out of all snap_version identifiers associated with all data blocks mapped by all leaves below the given node (i.e. accessible from the node when traversing the tree down). As was detailed above, responsive to destaging a data block associated with snap_version=k, the control layer searches for a leaf corresponding to the requested LBA and updates (1102) respective mappings in the leaf. If the snap_version=k of the destaged data block is not greater than a "node value" of a node representing the updated leaf, the updating process is stopped (1105). If the snap_version=k of the destaged data block is greater than the "node value" of the representing node, the control layer updates (1103) the "node value" of the representing node to become equal to k. The control layer further checks successively for each node above a node (i.e. nodes accessible from the node when traversing the tree up) with updated "node value" if "node value" of respective node is less than k and updates (1104) the "nodes values" to become equal to k. The control layer stops (1105) updating process at a first above node with "node value" not less than k.

Figure 12A:
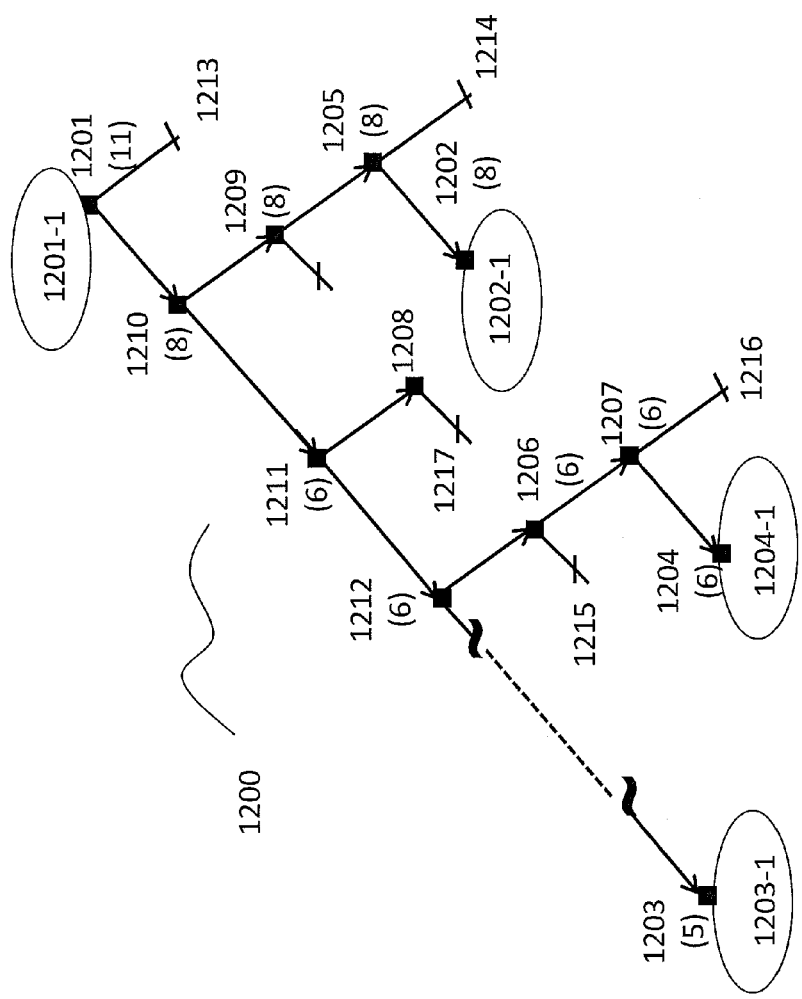
FIGS. 12a-12b illustrate exemplary mapping trees configured in accordance with certain embodiments of the presently disclosed subject matter.
Figure 12B:
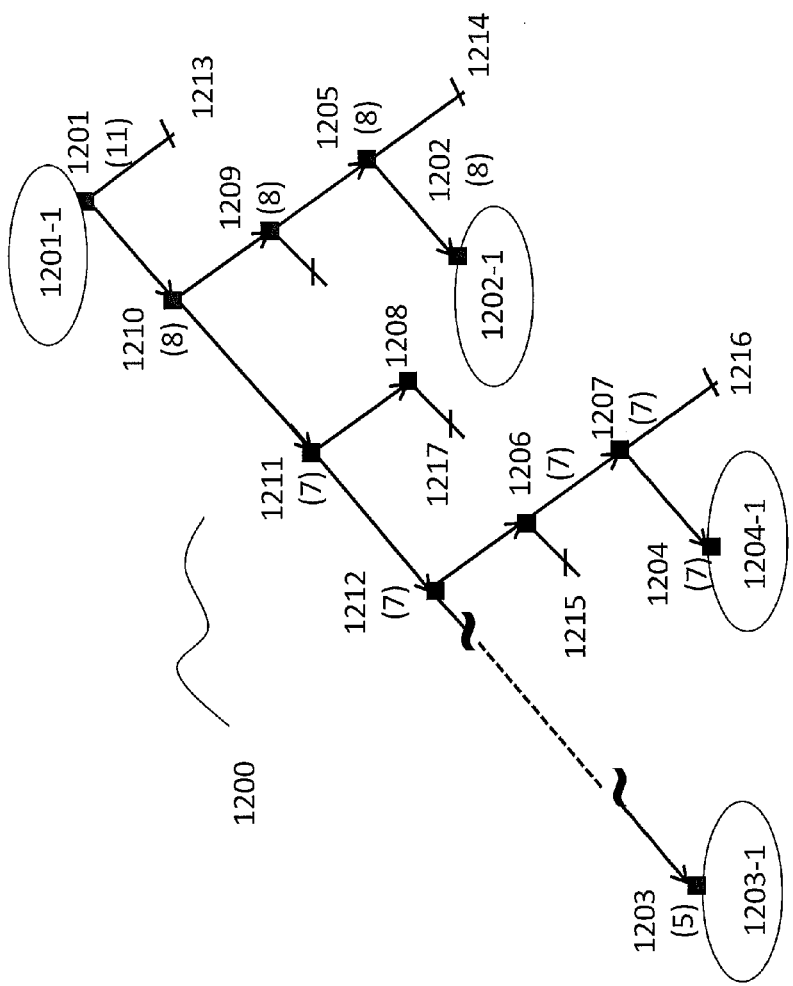

"Node values" for the nodes of the exemplary mapping tree illustrated in FIGS. 12a-12b are respectively denoted in brackets. FIG. 12b illustrates mapping tree of FIG. 12a updated responsive to destaging data block with snap_version=7 and mapped by leaf 1204-1. As illustrated, node values of the representing node 1204 and above nodes 1207, 1206, 1212 and 1211 have been updated to become equal to 7, and the updating process has been stopped at node 1210 having assigned "node value" greater than the snap_version of the destaged data block.

Figure 13:
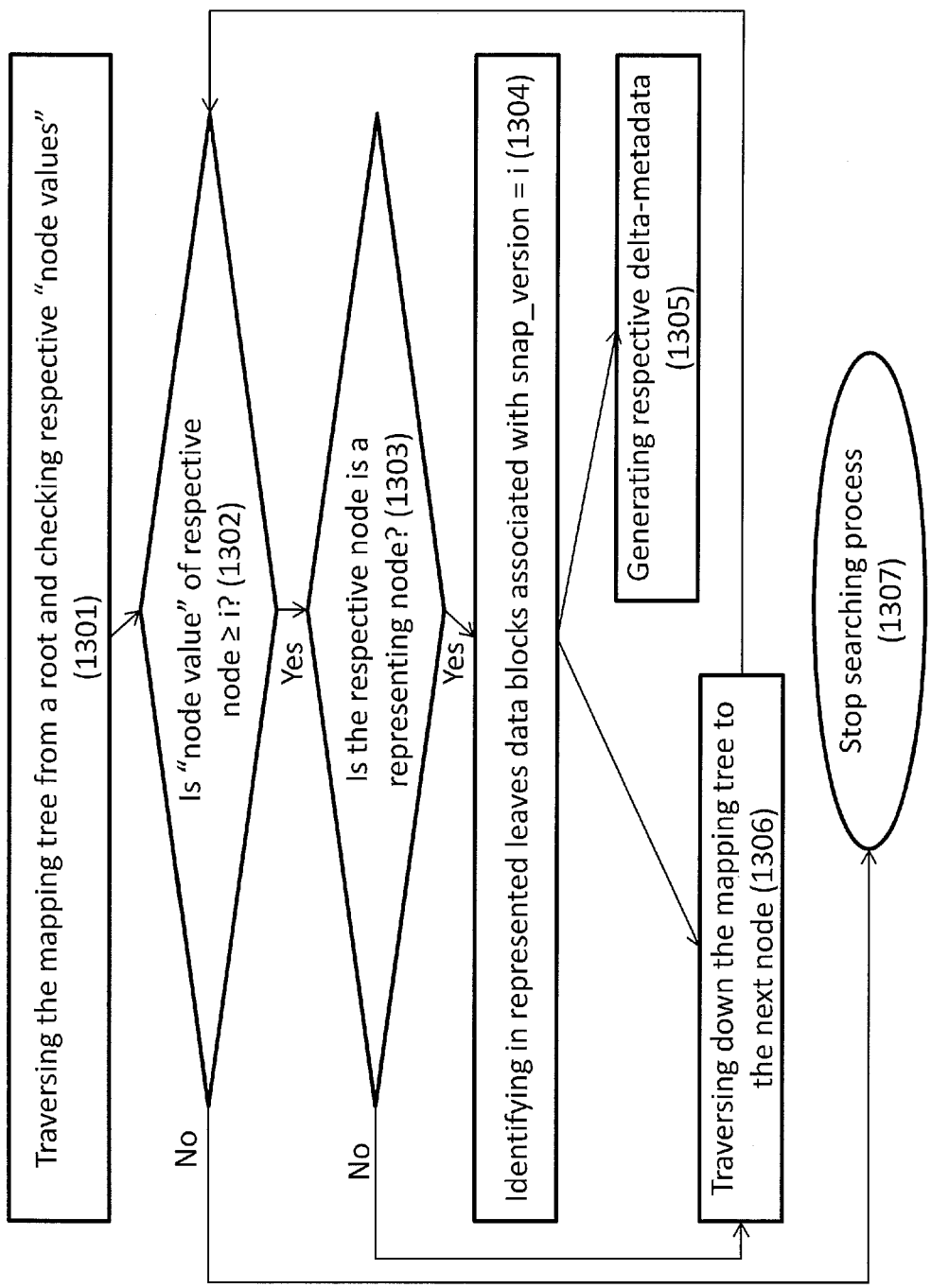
FIG. 13 illustrates a generalized flow-chart of traversing a mapping tree for identifying destaged delta-data in accordance with certain embodiments of the presently disclosed subject matter.

Referring to FIG. 13, there is illustrated a generalized flow-chart of traversing the mapping tree for identifying destaged meta-data in accordance with certain embodiments of the presently disclosed subject matter.

When searching (805) SF mapping data structure for destaged data blocks associated with snap_version=i, the control layer traverses down (1301) the mapping tree starting from a root node and successively compares (1302) for each node the "node value" and value snap_version=i. If "node value" is greater or equal than i, the control layer checks (1303) if the respective node is a representing node, i.e. if it has associated leafs. In the case of a representing node, the control layer identifies (1304) in the represented leaves data blocks associated with snap_version=i and generates (1305) respective delta-metadata. In the case of a non-representing node, the control layer traverses (1306) down the mapping tree to the next node. The control layer stops (1307) searching process at a first node with "node value" less than i. The control layer further joins delta-metadata generated for different leaves.

It is noted that, in the mapping tree handled as detailed in FIG. 11, no leaf under a node with "node value" less than i can comprise mappings of data blocks with snap_version=i, such data blocks relevant for identifying delta-data between points-in-time corresponding to snapshots $S_i$ and $S_i+_i$.

The process can be further optimized if each leaf has assigned "disk entry value" as was detailed with reference to FIG. 8. In such a case, upon identifying a representative node with "node value" not less than snap_version=i, the control layer searches solely leaves with "disk entry value" not less than i.

By way of non-limiting example, in a case of snap_version=7, when traversing the exemplary mapping tree illustrated in FIG. 12b, the control layer will search leaves 1201-1, 1202-1 and 1204-1 for respective delta-data. In a case of snap_version=12, the control layer stops searching after detecting that "node value" of the root node is less than the required snap_version.

The operations related to the process of identifying delta-data can be provided by a processor operating in conjunction with the cache management module and the snapshot management module, the processor using metadata (e.g. SF mapping structure, cache directory section, snapshots related metadata, etc.) stored in a memory (e.g. the same RAM memory for all metadata) operating in conjunction with the processor. The processor and/or the memory can be part of the functional modules involved in the operations.

Among advantages of certain embodiments of the presently disclosed subject matter is consistency of mapping between logical and physical addresses in the presence of snapshots, thus enabling consistency across snapshots, cache memory and permanent storage.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. For use in a storage system comprising a control layer with a cache memory and operable to manage a snapshot family (SF) constituted by hierarchically related SF members and mapped by a SF mapping data structure configured to provide logical-to-physical mapping for SF members, a method of identifying delta-data between two points-in-time, the method comprising:
   generating successive snapshots $S_i$ and $S_{i+1}$ corresponding to the two points-in-time;
   upon generating the snapshot $S_{i+1}$,
      searching the cache memory for data blocks associated with snap_version identifier indicative of snap_version=i, thereby yielding cached delta-metadata, wherein snap_version identifier associated with a given data block is indicative of the latest SF member existing at the time of writing the given data block to the cache memory;
      searching the SF mapping data structure for destaged data blocks associated with snap_version identifier indicative of snap_version=i, thereby yielding destaged delta-metadata, wherein the SF mapping data structure is configured to associate a given physical address with snap_version identifier indicative of the latest snapshot existing at the time of writing to the cache memory data corresponding, when destaged, to the given physical address; and
   joining the cached delta-metadata and the destaged delta-metadata, thereby yielding delta-metadata indicative of the delta-data between points-in-time corresponding to the successive snapshots with Snap_ID=i and Snap_ID=i+1.

2. The method of claim 1, wherein joining the cached delta-metadata and the destaged delta-metadata comprises selecting only cached delta-metadata if both delta-metadata and destaged delta-metadata are indicative of the same data block kept in the cache memory after destage.

3. The method of claim 1 further comprising:
   assigning to each cache mapping entry in the cache memory a constantly updated first value indicative of the highest snap_version identifier out of snap_version identifiers associated with data blocks mapped by the respective entry; and
   searching the cache memory for data blocks associated with snap_version identifier indicative of snap_version=i solely in cache mapping entries with assigned first value indicative of snap_version≥i.

4. The method of claim 1, further comprising:
   assigning to each SF mapping entry in the SF mapping data structure a constantly updated second value indicative of the highest snap_version identifier out of snap_version identifiers associated with data blocks mapped by the respective entry; and
   searching the SF mapping data structure for data blocks associated with snap_version identifier indicative of snap_version=i solely in SF mapping entries with assigned second value indicative of snap_version≥i.

5. The method of claim 1, wherein the SF mapping data structure is configured as an ordered mapping tree comprising a plurality of nodes, the method further comprising:
   assigning to each given node in the mapping tree a third value indicative of the highest snap_version identifier out of all snap_version identifiers associated with all data blocks mapped by all leaves represented by nodes below the given node;
   responsive to destaging a data block associated with a snap_version identifier indicative of snap_version=k, k greater than the third value, updating third value assigned to a representing node that represents a leaf mapping the data block to become equal to k; and
   traversing up the mapping tree and successively updating third values assigned to each node above the representing node to become equal to k, and stopping updating at a first with assigned third value not less than k.

6. The method of claim 5, wherein searching the SF mapping data structure for data blocks associated with snap_version identifier indicative of snap_version=i comprises:
   traversing down the mapping tree starting from a root node and successively comparing for each node the associated third value with snap_version=i value;
   for representing nodes with associated third value not less than snap_version=i value, identifying in the represented leaves data blocks associated with snap_version=i, thereby yielding delta-metadata for respective leaves;
   stopping traversing at a first node with assigned third value lower than i; and
   joining delta-metadata for respective leaves thereby yielding the destaged delta-metadata.

7. The method of claim 6, further comprising:
assigning to each leaf in the mapping tree a constantly updated second value indicative of the highest snap_version identifier out of snap_version identifiers associated with data blocks mapped by the respective leaf; and
for representing nodes with associated third value not less than snap_version=i value, searching data blocks associated with snap_version=i solely in represented leaves with assigned second value indicative of snap_version≥i.

8. The method of claim 1, wherein searching the SF mapping data structure for destaged data blocks is provided over data blocks accessible for access requests received from one or more hosts.

9. A storage system comprising a control layer and a cache memory therein, the control layer configured to manage a snapshot family (SF) constituted by hierarchically related SF members and mapped by a SF mapping data structure configured to provide logical-to-physical mapping for SF members,
wherein the control layer is further configured to identify delta-data between two points-in-time by providing at least the following:
generating successive snapshots $S_i$ and $S_{i+1}$ corresponding to the two points-in-time;
upon generating the snapshot $S_{i+1}$,
searching the cache memory for data blocks associated with snap_version identifier indicative of snap_version=i, thereby yielding cached delta-metadata, wherein snap_version identifier associated with a given data block is indicative of the latest SF member existing at the time of writing the given data block to the cache memory;
searching the SF mapping data structure for destaged data blocks associated with snap_version identifier indicative of snap_version=i, thereby yielding destaged delta-metadata, wherein the SF mapping data structure is configured to associate a given physical address with snap_version identifier indicative of the latest snapshot existing at the time of writing to the cache memory data corresponding, when destaged, to the given physical address; and
joining the cached delta-metadata and the destaged delta-metadata, thereby yielding delta-metadata indicative of the delta-data between points-in-time corresponding to the successive snapshots with Snap_ID=i and Snap_ID=i+1.

10. The system of claim 9, wherein the control layer is configured, when joining the cached delta-metadata and the destaged delta-metadata comprises, to select only cached delta-metadata if both delta-metadata and destaged delta-metadata are indicative of the same data block kept in the cache memory after destage.

11. The system of claim 9, wherein the control layer is further configured:
to assign to each cache mapping entry in the cache memory a constantly updated first value indicative of the highest snap_version identifier out of snap_version identifiers associated with data blocks mapped by the respective entry; and
to search the cache memory for data blocks associated with snap_version identifier indicative of snap_version=i solely in cache mapping entries with assigned first value indicative of snap_version≥i.

12. The system of claim 9, wherein the control layer is further configured:
to assign to each SF mapping entry in the SF mapping data structure a constantly updated second value indicative of the highest snap_version identifier out of snap_version identifiers associated with data blocks mapped by the respective entry; and
to search the SF mapping data structure for data blocks associated with snap_version identifier indicative of snap_version=i solely in SF mapping entries with assigned second value indicative of snap_version≥i.

13. The system of claim 9, wherein the SF mapping data structure is configured as an ordered mapping tree comprising a plurality of nodes, the control layer is further configured:
to assign to each given node in the mapping tree a third value indicative of the highest snap_version identifier out of all snap_version identifiers associated with all data blocks mapped by all leaves represented by nodes below the given node;
responsive to destaging a data block associated with a snap_version identifier indicative of snap_version=k, k greater than the third value, to update third value assigned to a representing node that represents a leaf mapping the data block to become equal to k; and
to traverse up the mapping tree and successively updating third values assigned to each node above the representing node to become equal to k, and stopping updating at a first with assigned third value not less than k.

14. The system of claim 13, wherein the control layer is further configured to search the SF mapping data structure for data blocks associated with snap_version identifier indicative of snap_version=i by providing at least the following:
traversing down the mapping tree starting from a root node and successively comparing for each node the associated third value with snap_version=i value;
for representing nodes with associated third value not less than snap_version=i value, identifying in the represented leaves data blocks associated with snap_version=i, thereby yielding delta-metadata for respective leaves;
stopping traversing at a first node with assigned third value lower than i; and
joining delta-metadata for respective leaves thereby yielding the destaged delta-metadata.

15. The system of claim 14, wherein the control layer is further configured:
to assign to each leaf in the mapping tree a constantly updated second value indicative of the highest snap_version identifier out of snap_version identifiers associated with data blocks mapped by the respective leaf; and
for representing nodes with associated third value not less than snap_version=i value, to search data blocks associated with snap_version=i solely in represented leaves with assigned second value indicative of snap_version≥i.

16. The system of claim 9, wherein the control layer is further configured to search the SF mapping data structure for destaged data blocks over data blocks accessible for access requests received from one or more hosts.

17. A non-transitory computer readable storage medium comprising computer readable program code embodied therein for operating storage system comprising a control layer with a cache memory and operable to manage a snapshot family (SF) constituted by hierarchically related SF members and mapped by a SF mapping data structure configured to provide logical-to-physical mapping for SF members, the computer readable program code causing the control layer to identify delta-data between two points-in-time by providing, at least, the following:

generating successive snapshots $S_i$ and $S_{i+1}$ corresponding to the two points-in-time;

upon generating the snapshot $S_{i+1}$, searching the cache memory for data blocks associated with snap_version identifier indicative of snap_version=i, thereby yielding cached delta-metadata, wherein snap_version identifier associated with a given data block is indicative of the latest SF member existing at the time of writing the given data block to the cache memory;

searching the SF mapping data structure for destaged data blocks associated with snap_version identifier indicative of snap_version=i, thereby yielding destaged delta-metadata, wherein the SF mapping data structure is configured to associate a given physical address with snap_version identifier indicative of the latest snapshot existing at the time of writing to the cache memory data corresponding, when destaged, to the given physical address; and joining the cached delta-metadata and the destaged delta-metadata, thereby yielding delta-metadata indicative of the delta-data between points-in-time corresponding to the successive snapshots with Snap_ID=i and Snap_ID=i+1.

* * * * *